United States Patent
Wang

(10) Patent No.: US 12,434,175 B2
(45) Date of Patent: Oct. 7, 2025

(54) METHOD, SYSTEM, AND FILTRATION UNIT FOR THE ISOLATION OF PARTICLES FROM BIOLOGICAL SAMPLES

(71) Applicant: Yantai Ausbio Laboratories Co., Ltd., Shandong (CN)

(72) Inventor: Zhaoqiang Wang, Shandong (CN)

(73) Assignee: Yantai Ausbio Laboratories Co., Ltd. (CN)

( * ) Notice: Subject to any disclaimer, the term of this patent is extended or adjusted under 35 U.S.C. 154(b) by 789 days.

(21) Appl. No.: 16/768,596

(22) PCT Filed: Nov. 30, 2017

(86) PCT No.: PCT/CN2017/113930
§ 371 (c)(1),
(2) Date: May 29, 2020

(87) PCT Pub. No.: WO2019/104637
PCT Pub. Date: Jun. 6, 2019

(65) Prior Publication Data
US 2021/0387113 A1    Dec. 16, 2021

(51) Int. Cl.
*B01D 24/10* (2006.01)
*B01L 3/00* (2006.01)
(Continued)

(52) U.S. Cl.
CPC .............. *B01D 24/10* (2013.01); *B01L 3/502* (2013.01); *C12N 5/0093* (2013.01); *C12N 5/0693* (2013.01); *C12N 5/0694* (2013.01); *G01N 21/07* (2013.01); *B01L 2300/0618* (2013.01); *B01L 2300/0681* (2013.01); *C12N 5/0075* (2013.01); *C12N 2525/00* (2013.01)

(58) Field of Classification Search
CPC . B01D 24/10; B01L 3/502; B01L 2300/0618; B01L 2300/0681; C12N 5/0093; C12N 5/0693; C12N 5/0694; C12N 5/0075; C12N 2525/00; G01N 21/07
USPC ...................................................... 435/288.6
See application file for complete search history.

(56) References Cited

U.S. PATENT DOCUMENTS 8,283,169 B1 * 10/2012 Wu ..................... C12N 5/0667
435/7.1
2018/0171295 A1 * 6/2018 Shi ....................... C12N 5/0636

FOREIGN PATENT DOCUMENTS

| CN | 101802213 A | 8/2010 |
| CN | 105242004 A | 1/2016 |

(Continued)

OTHER PUBLICATIONS

Grutzkau, A. et al. (2010). Small but mighty: How the MACS(R)-technology based on nanosized superparamagnetic particles has helped to analyze he immune system within the last 20 years. Cytometry Part A. (Year: 2010).*

(Continued)

*Primary Examiner* — Jill A Warden
*Assistant Examiner* — Jacqueline Brazin
(74) *Attorney, Agent, or Firm* — Klarquist Sparkman, LLP

(57) ABSTRACT

A method and an automated liquid handling system for the isolation of particles from a biological sample are provided. A column, a container and a filtration unit which are adapted to be used in such a method and system are provided. The column can include a section comprising a plurality of microbeads retained there.

14 Claims, 23 Drawing Sheets

(51) Int. Cl.
*C12N 5/00* (2006.01)
*C12N 5/09* (2010.01)
*G01N 21/07* (2006.01)

(56) References Cited

FOREIGN PATENT DOCUMENTS

| | | |
|---|---|---|
| EP | 2 511 011 A2 | 10/2012 |
| JP | S54-122713 A | 9/1979 |
| JP | 2004517310 A | 6/2004 |
| JP | 2006-226798 A | 8/2006 |
| JP | 4544498 B2 | 9/2010 |
| JP | 4870263 B2 | 2/2012 |
| JP | 2013-019904 A | 1/2013 |
| JP | 2013009674 A | 1/2013 |
| JP | 2013-514874 A | 5/2013 |
| JP | 5290432 B2 | 9/2013 |
| JP | 2016-153124 A | 8/2016 |
| WO | WO-2009018544 A1 * | 2/2009 ............... C12Q 1/04 |
| WO | WO-2010014970 A1 * | 2/2010 ............. B01D 15/22 |
| WO | WO 2017/153974 A1 | 9/2017 |
| WO | WO 2017/161371 A1 | 9/2017 |

OTHER PUBLICATIONS

International Search Report and Written Opinion, mailed Aug. 23, 2018, issued for PCT Application No. PCT/CN2017/113930, 9 pages.

\* cited by examiner

METHOD, SYSTEM, AND FILTRATION UNIT FOR THE ISOLATION OF PARTICLES FROM BIOLOGICAL SAMPLES

CROSS REFERENCE TO RELATED APPLICATION

This is the U.S. National Stage of International Application No. PCT/CN2017/113930, filed Nov. 30, 2017, which was published in English under PCT Article 21(2). The prior application is incorporated herein in its entirety.

FIELD OF THE INVENTION

The present invention relates to the field of high-throughput sample processing for diagnostic purposes. In particular, the present invention is directed to a method, an automated liquid handling system, a column, a container and a filtration unit for the isolation of particles from biological samples, preferably for (but not limited to) the isolation of rare particles, such as circulating rare cells (CRC), including circulating tumor cells (CTC) or circulating microemboli, such as circulating tumor microemboli (CTM), from blood samples.

BACKGROUND OF THE INVENTION

The time-point of cancer detection presents one of the main prognosis factors in the treatment of cancer patients, because most tumors are able to metastasize, thereby increasing the risk for a cancer relapse after treatment of the primary tumor. Metastatic cells, disseminated by tumor cells into the blood circulation, may occur very early, and importantly even before the primary tumor is detected via routine screening or diagnosis.

For the diagnosis and prognosis of cancer, invasive procedures such as tissue biopsies are commonly performed to gain insight into the presence and progression of the tumorous tissue. However, such invasive procedures are costly and furthermore set the patient at a higher risk for morbidity and psychological stress.

On the other hand, liquid biopsies, e.g. of the peripheral blood, are minimally invasive and may be applied for an early and serial assessment of several predictive factors and biomarkers for a variety of diseases and their treatment procedure, including follow-up screens during remission. For example, circulating rare cells (CRCs), such as circulating tumor cells (CTCs) and circulating tumor microemboli (CTMs), which are clamps of cells including CTCs, have been established as valuable biomarkers in the peripheral blood stream. The detection of CTCs and/or CTMs allows to evaluate the composition, invasiveness, drug susceptibility and therapy resistance of a tumor. The detection of CTMs is of particular importance, since these cell clusters appear to have a far greater metastatic potential than individual CTCs (Fabisiewicz et al., Med Oncol. 2017; 34 (1)).

The aim of rare particles isolation technologies is to harvest these particles in such a way that they are suitable for subsequent downstream analysis. The three main criteria for evaluating a system based on rare particles isolation are: high capturing efficiency, high isolation purity and high throughput.

A high capturing efficiency is defined by the ability to isolate all the targeted particles that are present in a sample. A high isolation purity refers to efficiently sorting only the targeted particles with no other (non-desired) particles. A high throughput refers to processing large sample volumes in a short time in order to make the system viable for clinical applications.

A main technical challenge in the detection of CTCs and CTMs is given by their extremely low number relative to other cells in the blood stream. CTCs are usually comprised in a ratio of 1 CTC to 5 Mio. other mononuclear cells, in particular leukocytes, and in a ratio of 1 CTC to more than a billion erythrocytes. Next to the rarity of these cells or microemboli, their respective heterogeneity in terms of morphology further challenges any detection method.

Several methods for the isolation of circulating rare cells, such as CTCs, are known from the prior art, which either relate to the detection of specific CTC surface markers or to physical differences between CTCs and other blood cells, such as size, density, deformability, or electrical properties. Moreover, microfluidic devices for the isolation of rare cells have been developed.

In the context of the detection of cell surface marker profiles, immunoaffinity-based enrichment systems, such as provided by CellSearch®, are based on monoclonal antibodies that target epithelial cell adhesion molecules (Ep-CAMs) of CTCs. The antibodies are coupled to ferrofluid nanoparticles, which can be magnetically separated from the blood sample.

Regarding physical separation techniques, filtration methods, such as the ISET (isolation by size of epithelial tumor cells) and ScreenCell™, provide porous filters to separate CTCs from erythrocytes and leukocytes by size. Circulating tumor cells have diameters in the range of 12 to 25 µm, and are therefore mostly larger than leukocytes comprising diameters of 8 to 14 µm and erythrocytes being of about 7 µm in size (Ferreira et al., Mol Onc. 2016; 10). By selecting filters of an appropriate pore size, larger circulating tumor cells can thus be retained by the filter.

OncoQuick® is a device comprising a porous barrier that allows erythrocytes and leukocytes to pass the barrier, while CTCs are retained. The device further comprises a density-based centrifugation step to achieve a more effective enrichment of the CTCs.

Furthermore, microfluidic devices have been developed to separate cells based on differences in size. For example, Zheng et al. (Biomed Microdevices 2011; 13) developed a 3D microfilter device for viable CTC enrichment from blood, wherein two porous PDMS layers are stacked in the microfluidic device. The configuration of the two layers in the microfluidic device reduces the stress exerted on the cell membranes during filtration of the sample.

Further separation techniques are described in the following prior art references:

EP 0485228 A1 relates to a method for detecting the binding of ligands, comprising detecting the presence or absence of agglutinates on top of or within a matrix of substantially non-compressible microparticles.

EP 0536658 A1 relates to a method for performing a population frequency distribution analysis of density of subsets of erythrocytes in a sample of whole blood.

U.S. Pat. No. 4,234,317 relates to a method of fractionating a plasma or serum blood sample comprising inter alia a plurality of inert members having a large surface area coated with a substantially dry reagent aliquot.

U.S. Pat. No. 7,214,348 relates to a microfluidic device comprising flow-restricting particles. The flow-restricting particles may include a gel filtration material.

However, each of the methods described in the prior art has certain drawbacks. Immunoaffinity-based systems rely on specific cell surface expression profiles of cancer cells, which may, however, vary considerably. In particular, the targeted antigen EpCAM is no longer expressed in tumor cells that undergo epithelial to mesenchymal transition (EMT). Moreover, targeted antigens on the cell surface remain blocked after isolation of the cells, rendering further analysis of, for example, cell surface expression profiles difficult.

On the other hand, physical separation techniques also suffer from drawbacks. For example, if porous filters are used to separate CTC from leukocytes, the partial overlap in size creates inaccuracies in the results. Moreover, physical separation techniques comprise the risk that during separation the cells may be damaged. Cell damage can occur, for example, when the cells nonspecifically interact with the porous filter. Furthermore, due to cell-to-cell interactions or cell-to-filter interactions, the pores of the filters may clog. Such clogging not only inhibits the filtration process, but can also lead to a higher shear stress for the cells while passing through or being trapped within the filtrating pores. A high-shear stress and pressure is also associated with cell deformability, ultimately affecting the performance of filtration techniques. For example, CTC clusters containing up to 20 cells are known to traverse constrictions of 5 to 10 µm even in whole blood (Au et al., PNAS 2016; 113(18)). Such clusters, therefore, can bypass also filtration pores of smaller diameter by means of deforming, and are thus not detected.

Microfluidic devices suffer from highly complex designs, long processing times and a low throughput. Moreover, captured viable cells are extremely difficult to extract from microfluidic devices. Extraction is, however, necessary in case further downstream applications outside the microfluidic flow chambers need to be performed. Furthermore, such devices usually comprise volumes of only a few nanoliters to even femtoliters. Circulating rare cells are, however, comprised in very low concentrations in blood (e.g. CTCs in a concentration of only about 1 to 10 cells per ml whole blood, Millner et al., Ann Clin Lab Sci, 2013), leading to extremely long processing times. Increasing the flow rates to overcome this time limitation is often not a viable choice, because the simultaneous increase in shear force would eventually damage the cell membrane. Finally, microfluidic devices are often built from PDMS for practical reasons. PDMS dissolves, however, gases and hydrophobic compounds, resulting in air bubble formation and nonspecific attachment of cells to the PDMS surface, which can be eventually deleterious for the cells.

Therefore, in view of the above described disadvantages of the known systems for the isolation of rare tumor cells, there is still a demand for a method to capture all target particles that are present in a biological sample, to efficiently isolate only the target particles and to process large sample volumes in a short time. There is also a need for a column and filtration matrix adapted to perform such an isolation method, more precisely a column for isolating and recovering selected biological material in a biological sample, preferably for (but not limited to) use as a column for filtering a blood sample and isolating rare particles—such as circulating rare cells (CRC), including circulating tumor cells (CTC) or circulating tumor microemboli (CTM). Such a column and/or filtration unit should preferably be further adapted to be used when processing large sample volumes in a short time, for instance the column/filtration unit may be adapted to be integrated into a system suitable for automation and high throughput processing.

SUMMARY OF THE INVENTION

The present invention solves the shortcomings of the state of the art by providing a method for the isolation of particles from a biological sample, wherein the method comprises the steps:
  providing a column with an upper opening and a lower opening, wherein the column comprises at least a first section, the first section comprising a first plurality of microbeads of a first diameter, wherein the first plurality of microbeads is retained in the column to prevent the first plurality of microbeads from passing through the lower opening;
  applying the biological sample onto the filtration matrix through the upper opening of the column;
  separating a first portion of particles of the biological sample from a second portion of particles of the biological sample,
  wherein the first portion of particles of the biological sample passes through the first section, and wherein the first section retains the second portion of particles of the biological sample;
  suspending the retained second portion of particles of the biological sample and the first section in a buffer solution to form a suspension;
  separating the suspended second portion of particles of the biological sample from the suspended first section.

The suggested method for the isolation of particles, for example rare cells, from a biological sample, is based on the separation of particles by size. The first section, acting as a filtration matrix, comprises microbeads of a specific diameter and thereby provides well-defined interstices between neighboring microbeads. These interstices act as a filter for the biological sample, i.e. particles of a size that is above the size of the formed interstices, are trapped by the microbeads. The smaller the diameter of the microbeads is chosen, the smaller is the interstice and thus the effective filter size. Thus, the first section comprising microbeads can trap the particles whose diameter is larger than the interstice formed by the microbeads ("second portion of particles"), whereas the remaining portion passes through these interstices ("first portion of particles").

The interstitial volume between the microbeads, which is generally shaped as a three-dimensional tunnel structure, provides for a minimized area of contact when targeted particles are trapped within the interstices. At the same time, residual volumes of the interstices, which are not occupied by the trapped particles, reduce the shear stress experienced by the trapped particles, and prevent clogging of the filtration matrix by allowing particles below the critical interstice diameter to pass through. Given 40 µm microbeads size, this amounts to 576 interstices per square millimeter. This is far more denser and stable than other size based isolation technique. i.e. through porous hole, constrictions/posts. Consequently, the performance issues associated with the clogging as experienced in some of the previously known methods are avoided.

Another advantageous feature of the at least first section of microbeads is the capability to capture particles that exhibit a high degree of deformability. In particular clusters of cells are able to squeeze through traditional porous filtration system, provided that sufficient pressure and stress is applied. By providing such a section with a plurality of microbeads, acting as filtration matrix, and thus a plurality of filtering interstices along the flow path, even particles that tend to deformation are likely to be captured. Furthermore, during filtration, the curvature of the microbeads help to mitigate cell damage, thereby allowing to isolate intact, viable cells after separation.

By suspending the filtered, trapped second portion of particles in the buffer solution, the ordered arrangement of the first section is lost. Thereby, the microbeads of the first section do not form any longer an effective filter based on the diameter of the microbeads of the first section. As a consequence, the second portion of particles is released into the buffer solution and can be separated from the first section.

In a further embodiment, the first portion of particles of the biological sample is separated from the second portion of particles of the biological sample by means of gravity or by application of a centrifugal force, preferably wherein the separated first portion of particles of the biological sample is collected in a first container.

In particular the application of a centrifugal force allows a fast separation of the first and the second portion of particles. The centrifugal force may be adapted to the biological sample in order to not damage the biological samples or not to deform the particles of the biological sample.

In a further embodiment, the suspended second portion of particles is separated from the suspended first section by means of gravity or application of a centrifugal force. A centrifugal force particularly allows separation of the particles from remaining microbeads, since the microbeads have different density and size than the particles.

The suspended second portion of particles may be isolated alternatively or in addition by other means, such as immune-affinity based enrichment or density-based enrichment.

The method may further comprise the step of concentrating the separated second portion of particles.

The separated second portion of particles may be concentrated by means of application of a centrifugal force. For example, the second portion of particles may be centrifuged at 1000-2000 g for 10 to 15 minutes in a centrifugation reservoir or a third container to collect the second portion of particles at the bottom of the centrifugation reservoir or the third container.

The method may further comprise the step of transferring the separated second portion of particles to a down-stream analysis. The down-stream analysis may comprise a microscopic analysis or bulk biochemical analysis. The step of transferring may be performed after separating the suspended second portion of particles of the biological sample from the suspended first section and/or after the step of concentration the separated second portion of particles.

The microbeads may be substantially non-compressible. This allows that the size of the interstices of the microbeads, i.e. the effective filter or pore size, remains well-defined even when a centrifugal force is applied.

The microbeads may be substantially non-porous. This allows that the particles of the biological samples, i.e. the first portion and the second portion of particles, do not penetrate into the microbeads and are thus not trapped within the microbeads. Thereby, only the interstices formed between microbeads determine the filter size during the separation of the second portion of particles from the first portion of particles. Depending on the size of the particles that shall be isolated, the interstice size can thus be calculated before performing the method. Thereby, in contrast to conventional gel filtration techniques, a calibration of the filtration matrix does not need to be performed.

The microbeads may be comprised of glass, ceramic, one or more polymers selected from the group consisting of nylon, polytetrafluoroethylene, polystyrene, polyacrylamide, sepharose, agarose, cellulose, cellulose derivatives, and dextran, and/or metals. Sepharose, agarose, cellulose, cellulose derivatives, and dextran may be optionally cross-linked. These materials proved compatible with biological samples.

The microbeads may be magnetic. In particular, only a portion of the microbeads, such as the microbeads of one or more sections may be magnetic. For example, the second section may comprise magnetic microbeads. During the step of separating the second portion of particles, a magnetic force may then be applied to separate the second section from the second portion of particles.

The microbeads may be insoluble and/or immiscible in biological samples, such as blood fluids. Thereby, the microbeads are stable during the isolation of the particles, and may be reused.

The microbeads may be non-reactive with biological samples. Thereby, only the interstice size determines the separation and isolation of particles of the biological sample.

Alternatively, the first section may comprise microbeads that are reactive to at least a portion of the particles of the biological sample. In particular, antibodies may be coupled to microbeads that are directed against antigens comprised in the biological sample, preferably antigens comprised on the surface of biological cells.

The first section may be suspendable. Thus, the first section may be provided in such a way, that it is not confined by any non-removable physical boundaries or confinements, such as fixed filters on the top and the bottom of the filtration matrix. In consequence, the second portion or particles, the microbeads of the first section and the buffer can form a suspension, from which the second portion of particles can be separated in a straight-forward way, e.g. by centrifugation.

The first diameter of the microbeads may be in a range of 20 to 700 µm, preferably 50 to 600 µm. This diameter allows the formation of filtering interstices between 3 and 110 µm. Such interstice sizes allow separation of a variety of biological particles, for example cell clusters or large CTCs.

The first diameter of the microbeads may alternatively be in a range of 10 to 1000 nm, preferably 50 nm to 500 nm, more preferably 100 nm to 300 nm. These microbead sizes allow separation of biological particles in the nanometer regime, such as extracellular vesicles, which have sizes of between 20 to 50 nm (exosomes), or microvesicles, which have sizes of between 50 and 1000 nm.

Further, the first diameter of the microbeads may alternatively be in a range of 1 µm to 20 µm. This diameter allows for example the separation of apoptotic bodies.

The afore-mentioned characteristics of the microbeads may apply to each of the afore-mentioned and the following embodiments.

In a further embodiment, in the step of providing the column with an upper opening and a lower opening the first section of the filtration matrix is retained in the column by a constricting means that is positioned at the lower opening. Thereby, the first section is stably positioned in the column and does not flow through the lower opening. While the constricting means allows stabilization of the microbeads of the first section in the column, it also allows that buffer and smaller sized particles, e.g. the first portion of particles, may flow through the column and exit the lower opening. Thus, the constriction means does not entirely block the lower opening, but merely constricts the lower opening.

The constricting means may be temporarily positioned at the lower opening of the column and/or may be removable.

Thus, the constricting means may be positioned at the lower opening of the column during the step of separating the first portion of particles from the second portion of particles, and may be removed after the step of separating the first portion of particles from the second portion of particles, and/or during the step of forming a suspension of the second portion of particles and the filtration matrix, and/or after the step of forming a suspension of the second portion of particles and the filtration matrix.

In one embodiment, the constricting means comprises a second section comprising a second plurality of microbeads of a second diameter, wherein the first diameter is smaller than the second diameter. The second section can effectively block the lower opening of the column, thereby supporting the first section.

In a further embodiment, the constricting means comprises the second section and/or a mechanical barrier positioned at the lower opening of the column. The mechanical barrier may be a filter or parts of the lower opening of the column that support the microbeads of the second section. The lower opening may, for example, be formed as a cross or as a filter to support the second section.

In an alternative embodiment, the constricting means is a plug, preferably a removable plug. The constricting means, e.g. the plug, may be provided by a container that is positioned below the column. In particular, the constricting means may be a centered protrusion that is positioned at the lower opening of the column wherein at least a portion of the protrusion fits into the column. The centered protrusion may comprise at least an upper portion and a lower portion wherein the upper portion fits into the column, and wherein the lower portion supports the lateral walls of the lower opening of the column. Alternatively, the plug may be a porous, removable lid to be positioned at the lower opening of the column.

In a further embodiment, the first section and the second section are provided as stacked layers with the first section being the top layer.

By applying the sections comprising microbeads of different diameters in a layered geometry, the column does not require an additional mean to retain the microbeads of the first section. Rather, the second section with the larger microbeads can effectively block the lower opening of the column. By suspending the retained second portion of particles in the buffer solution, the ordered arrangement of both the first and second section of the filtration matrix is lost, and the second portion of particles is released into the buffer solution, while also the blockade of the lower opening of the column is reduced or removed. Thereby, the suspended second portion of particles can, for example, exit the column through the lower opening, along with the smaller sized microbeads, leaving the larger sized microbeads in the column.

In a further embodiment, the column comprises a plurality of sections, two of the sections being the first section and the second section, wherein each section comprises a plurality of microbeads of a specific diameter, the plurality of sections differs at least by the specific diameter of the microbeads, wherein the first diameter of the first section comprises the smallest diameter.

In a further embodiment, the plurality of sections is provided as stacked layers, the first section being the top layer, and wherein the specific diameter of the microbeads of the plurality of sections increases gradually from the top layer to the bottom layer. This geometry prompts a reduced flow pressure, as each section towards the bottom layer comprises larger interstices. Thereby, the throughput is increased.

In a further embodiment, the plurality of sections comprises 3 to 7 sections. This range reflects optimal flow pressure profiles, as well as optimal separation of particles, such as separation and isolation of CTCs or microemboli.

In a further embodiment, the particles of the biological sample are enriched by a density gradient centrifugation step before being applied onto the first section. Such enrichment step may be in particular favorable in order to reduce the volume of the biological sample that is applied onto the first section.

In a further embodiment, the method is applied for the isolation of circulating tumor cells, wherein the first diameter is in a range of 80 to 200 μm.

In a further embodiment, the method is applied for the isolation of circulating microemboli, wherein the first diameter is in a range of 200 to 600 μm.

In a further embodiment, the method is applied for the isolation of extracellular vesicles, wherein the first diameter is in a range of 10 to 1000 nm, preferably 50 to 500 nm, more preferably 100 to 300 nm.

In a further embodiment, the method is implemented in an automated liquid handling platform.

In another aspect, the present invention also relates to an automated liquid handling system for the isolation of particles from a biological sample, wherein the system comprises:
 means for positioning a column comprising an upper opening and a lower opening onto a first container, wherein the column is provided with at least a first section comprising a first plurality of microbeads of a first diameter, wherein the first plurality of microbeads is retained in the column to prevent the first plurality of microbeads from passing through the lower opening, in order to separate a first portion of particles of the biological sample from a second portion of particles of the biological sample;
 means for transferring liquid solutions into the column, the first container and/or a second container;
 means for aspirating liquid solutions from the column, the first reservoir container and/or the second container; and
 means for centrifuging the column, the first reservoir container and/or the second container.

The liquid sample may comprise a volume of at least 0.1 ml. The liquid sample may comprise a volume of at most 500 ml. Such volumes allow processing of the biological sample in an efficient manner. For example, for the detection of CTCs, typically at least 2 ml blood sample is required. In view of the rarity of CTCs, preferably larger volumes, such as 10 ml whole blood sample, are taken in order to increase the likelihood of detection of the rare cells.

In another aspect, the present invention also relates to a column adapted to be used in a method for the isolation of particles from a biological sample, wherein the column comprises:
 an upper chamber for receiving the biological sample, and defined on its lateral sides by one or more lateral column walls, extending into a tapered portion on its lower end,
 an elongated channel extending from the tapered portion downwardly to a lower opening,
 wherein,
  the elongated channel is at least partially filled with at least a first section comprising a first plurality of microbeads of a first diameter, wherein the first plurality of microbeads is retained in the column to prevent the first plurality of microbeads from passing through the lower opening.

In a further embodiment, the column may further comprise a lid part, which comprises an upper opening through which the biological sample is received, to seal the upper chamber.

In a further embodiment, a constricting means is positioned at the lower opening of the elongated channel to retain the first plurality of microbeads in the column.

The constricting means may comprise a second section comprising a second plurality of microbeads of a second diameter, wherein the first diameter is smaller than the second diameter.

The constricting means may comprise a cross-shaped ending of the lower opening that retains the second section. The dimensions are chosen such that the microbeads positioned above the constricting means are retained by the cross-shape of the means. It is conceivable that the dimensions of the cross-shaped ending are chosen such that at least one section of microbeads, in particular the first plurality of microbeads, fits through the constricting means.

The constricting means may comprise a porous filter.

The at least first section and second section may comprise microbeads as defined above for the method according to the present invention. In particular, the microbeads may be substantially non-compressible. Further, the microbeads may be non-porous. In particular, the microbeads may be comprised of glass, ceramic, one or more polymers selected from the group consisting of nylon, polytetrafluoroethylene, polystyrene, polyacrylamide, sepharose, agarose, cellulose, cellulose derivatives, and dextran, and/or metals. The microbeads may be magnetic. The microbeads may be insoluble and/or immiscible in biological samples, such as blood fluids. The microbeads may be non-reactive with biological samples. Alternatively, the column may comprise microbeads that are reactive to at least a portion of the particles of the biological sample. The first section and/or second section may be suspendable. The first diameter of the microbeads may be in a range of 20 to 700 µm, preferably 50 to 600 µm, or in a range of 10 nm to 1 µm, preferably 50 nm to 500 nm, more preferably 100 to 300 nm, or in a range of 1 µm to 20 µm. In a further embodiment, the first section and the second section are provided as stacked layers with the first section being the top layer. In a further embodiment, the column comprises a plurality of sections, two of the sections being the first section and the second section, wherein each section comprises a plurality of microbeads of a specific diameter, the plurality of sections differs at least by the specific diameter of the microbeads, wherein the first diameter of the first section comprises the smallest diameter. In a further embodiment, the plurality of sections is provided as stacked layers, the first section being the top layer, and wherein the specific diameter of the microbeads of the plurality of sections increases gradually from the top layer to the bottom layer. In a further embodiment, the plurality of sections comprises 3 to 7 sections.

In yet another aspect, the present invention also relates to a container, wherein the container comprises a container chamber for receiving a part or all of the biological sample, and defined on its lateral sides by one or more lateral container walls, wherein the container is arranged such that when the column is placed on top of the container, the elongated channel of the column protrudes into the container chamber.

The bottom of the container may comprise tapered bottom walls to build a trap portion (36).

The container may comprise a centered protrusion (39) as a constricting means to be positioned at the lower opening of the elongated channel of the column wherein the protrusion fits into the elongated channel of the column.

The centered protrusion may comprise at least an upper portion and a lower portion, wherein the upper portion fits into the elongated channel of the column, and wherein the lower portion supports the lateral walls of the lower opening of the elongated channel. The lower portion may have, for example, a larger diameter than the upper portion. The change in diameter may be continuous (e.g. in form of a truncated cone) or the change in diameter may be discontinuous. Preferably, a passage is formed between the lateral walls of the elongated channel and the lateral walls of the protrusion, which allows a liquid to flow through the passage and into the container chamber. Such passage may, for example, have a width of 10 to 40 µm, preferably about 20 µm. Thus, while liquid and smaller particles can flow from the column into the container chamber through the passage, larger particles, in particular microbeads above this size, are stably positioned in the column.

The present invention also relates to a filtration unit comprising a column as described above and further comprising a container as described above.

The term "particles" as used herein includes, but is not limited to cells, blood cells, cord blood cells, bone marrow cells, erythrocytes, leukocytes, lymphocytes, epithelial cells, stem cells, cancer cells, tumor cells, circulating tumor cells, cell precursors, hematopoietic stem cells, mesenchymal cells, stromal cells, platelets, sperms, eggs, oocytes, microbes, microorganisms, bacteria, fungi, yeasts, protozoans, viruses, organelles, nuclei, nucleic acids, mitochondria, micelles, lipids, extracellular vesicles, proteins, protein complexes, cell debris, parasites, fat droplets, multi-cellular organisms, spores, algae, clusters or aggregates of the above. The particles may be rigid or deformable, and could have a variety of sizes and shapes. The particles may vary in size, e.g. may have a maximum diameter, from about 20 nm to about 1 mm.

The biological sample can be any fluid, gel or solution containing biological elements. For instance, the biological sample from which rare cells are to be extracted can be any body fluids from a human or animal or a dispersion of a cellular tissue. Examples thereof are blood, in particular peripheral blood such as venous or arterial blood, lymph, urine, exudates, transudates, spinal fluid, seminal fluid, saliva, fluids from natural or unnatural body cavities, bone marrow and dispersed body tissue. The most preferred body fluid is peripheral blood.

"Substantially non-compressible" in the context of the present invention relates to the resistance of the microbeads to a change in shape or size that may be caused by the exertion of force to the microbeads, such as centrifugal force, magnetic force, electrical force, hydrostatic pressure, force by negative or positive pressure, and the like, or storage for long periods of time with normal gravitational force. Substantially non-compressible microbeads exhibit a compression factor of at most 1.5, preferably at most 1.2, more preferably at most 1.1, wherein the compression factor (CF) is defined as CF=gravity settled volume/packed bed volume. Packing of a column with the microbeads can be performed by centrifugation at 2-100 g or by connecting the column to a vacuum pump for a suitable time until the bed volume remains constant.

"Substantially non-porous" in the context of the present invention refers to the porosity of the microbeads in relation to the particles of interest of the biological sample, i.e. the first portion and the second portion of particles to be separated and isolated. These particles cannot infiltrate the substantially non-porous microbeads. This does not exclude, however, that the microbeads comprise pores in a size range below the sizes of the particles, i.e. the microbeads can have a cut-off value (or exclusion limit) below the particles' sizes. Therefore, the substantially non-porous microbeads may be in general infiltrated by small molecules, such as oligonucleotides or peptides that are below the size exclusion limit of the microbeads.

The diameter of the microbeads of the first plurality of microbeads, the second plurality of microbeads, and any of the further pluralities of microbeads are, in practice, not exactly of uniform size. For example, commercially available microbeads are not strictly homogenous and comprise a distribution of diameters. For example, the unwashed glass beads of Sigma-Aldrich®, product number G9143, comprise a mesh size, wherein 90% of the microbeads are indicated to be within a range of 212 to 300 µm. Using these unwashed glass beads in one section should be understood as microbeads of a "first diameter", a "second diameter", and/or a "specific diameter". For the purposes of the present invention, the exact distribution of the microbeads' diameters may vary, depending upon the desired application. It is, however, essential that the filtration effect as set out above is achieved due to the various sections of microbeads. Preferably, in one application, at least 50% of the microbeads of the microbeads have substantially the same diameter or a narrow distribution. In other applications, at least 60%, at least 70%, at least 80% or at least 90% of the microbeads of the microbeads have substantially the same diameter or a narrow distribution. Also, it is possible that 100% of the microbeads of the microbeads have substantially the same diameter or a narrow distribution.

BRIEF DESCRIPTION OF THE FIGURES

Currently preferred embodiments of the present invention will be described in the following detailed description with reference to the following figures.

DETAILED DESCRIPTION OF THE EMBODIMENTS

Preferred embodiments and examples of the invention will be described in the following detailed description. It is emphasized, however, that the present invention is not limited to these embodiments.

The present invention relates to a method, a system, a column, a container and a filtration unit for the isolation of particles from a biological sample to overcome the above-mentioned limitations and challenges known from the prior art. Advantageously, the method, the system, the column, the container and the filtration unit may provide for a high throughput filtration of large volumes of sample while preserving cell viability and providing high yields and high purity.

The suggested method as well as the system, the column and filtration unit intended for the isolation of biological are based on or comprise a first section comprising microbeads of a specific diameter. These microbeads form interstices that serve as filters for the biological particles; biological particles of a diameter or size above the size of the interstices are trapped in the section. Advantageously, the interstitial volume between the microbeads, which is shaped as a three-dimensional tunnel structure, provides for a minimized area of contact when targeted particles are trapped within the interstices. At the same time, residual volumes of the interstices, which are not occupied by the trapped particles, reduce the shear stress experienced by the trapped particles, and prevent clogging of the filtration matrix by allowing particles below the critical interstice diameter to pass through. The first section, being a three-dimensional matrix of filtering interstices, is furthermore able to separate and trap particles that usually deform in constrictions, thereby evading being trapped.

The trapped particles can be recovered from the first section in a straight-forward manner. Importantly, according to the suggested method, the particles remain in a buffered solution, thereby increasing the likelihood of isolating live, non-damaged biological particles.

Figure 1A:
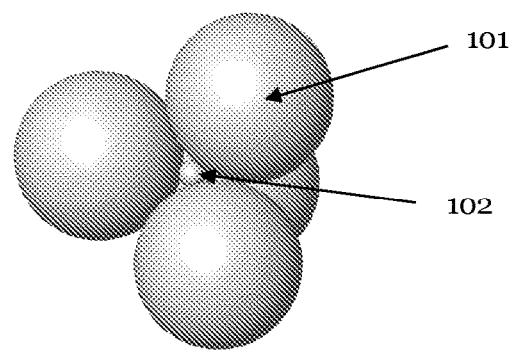
FIGS. 1a to c: show schematic representations of interstices formed by three neighboring microbeads, which can be used as filters according to the present invention.
Figure 1B:
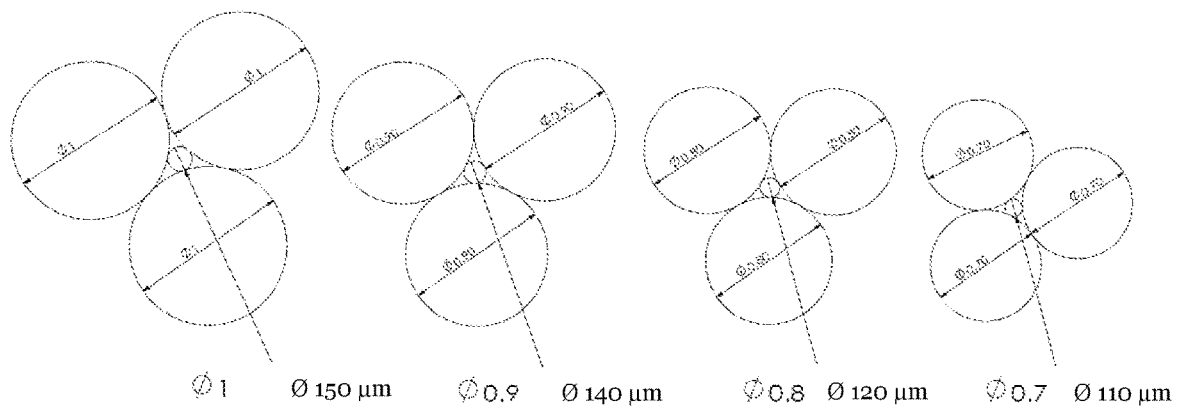

FIG. 1a illustrates the formation of an interstice, trapping a round particle 102. The interstice is formed by at least three adjacent microbeads 101. The interstice diameter, formed by three adjacent microbeads can be calculated according to the following formula $$d = \frac{2 - \sqrt{3}}{\sqrt{3}} D$$

with d being the diameter of the interstice formed by three microbeads, and D being the diameter of each of the microbeads. FIG. 1b as well as Table 1 comprise calculated interstices for exemplary microbeads of homogeneous size.

The distribution of a microbeads matrix of the first section is relatively consistent. For example, microbeads with a specific diameter of 500 µm provide constant and precise interstices that capture particles with 80 µm diameter and above. Obviously, in practice, the precise interstice might slightly deviate from the calculated values. However, generally speaking, if for example the microbeads are non-compressible, values corresponding to or very close to the calculated interstice diameter are achieved.

TABLE 1

Pore diameters for homogeneously sized microbeads.

| Microbead diameter (µm) | Interstice diameter (µm) |
| --- | --- |
| 1000 | 150 |
| 900 | 140 |
| 800 | 120 |
| 700 | 110 |
| 600 | 93 |
| 500 | 80 |
| 400 | 60 |
| 300 | 50 |
| 200 | 30 |
| 100 | 15 |
| 90 | 14 |
| 80 | 12 |
| 70 | 11 |
| 60 | 9 |
| 50 | 8 |
| 40 | 6.2 |
| 30 | 4.6 |
| 20 | 3.1 |
| 10 | 1.5 |
| 9 | 1.39 |
| 8 | 1.24 |
| 7 | 1.08 |
| 6 | 0.93 |

Figure 1C:
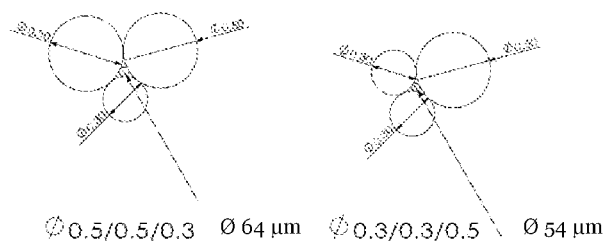

By using a mixture of differently sized microbeads, the interstice diameter changes, which can be measured or calculated (FIG. 1c, Table 2).

TABLE 2

Pore diameters for heterogeneously sized microbeads.

| Microbead diameter (µm) | Interstice diameter (µm) |
| --- | --- |
| 500, 500, 300 | 64 |
| 500, 300, 300 | 54 |

Figure 2A:
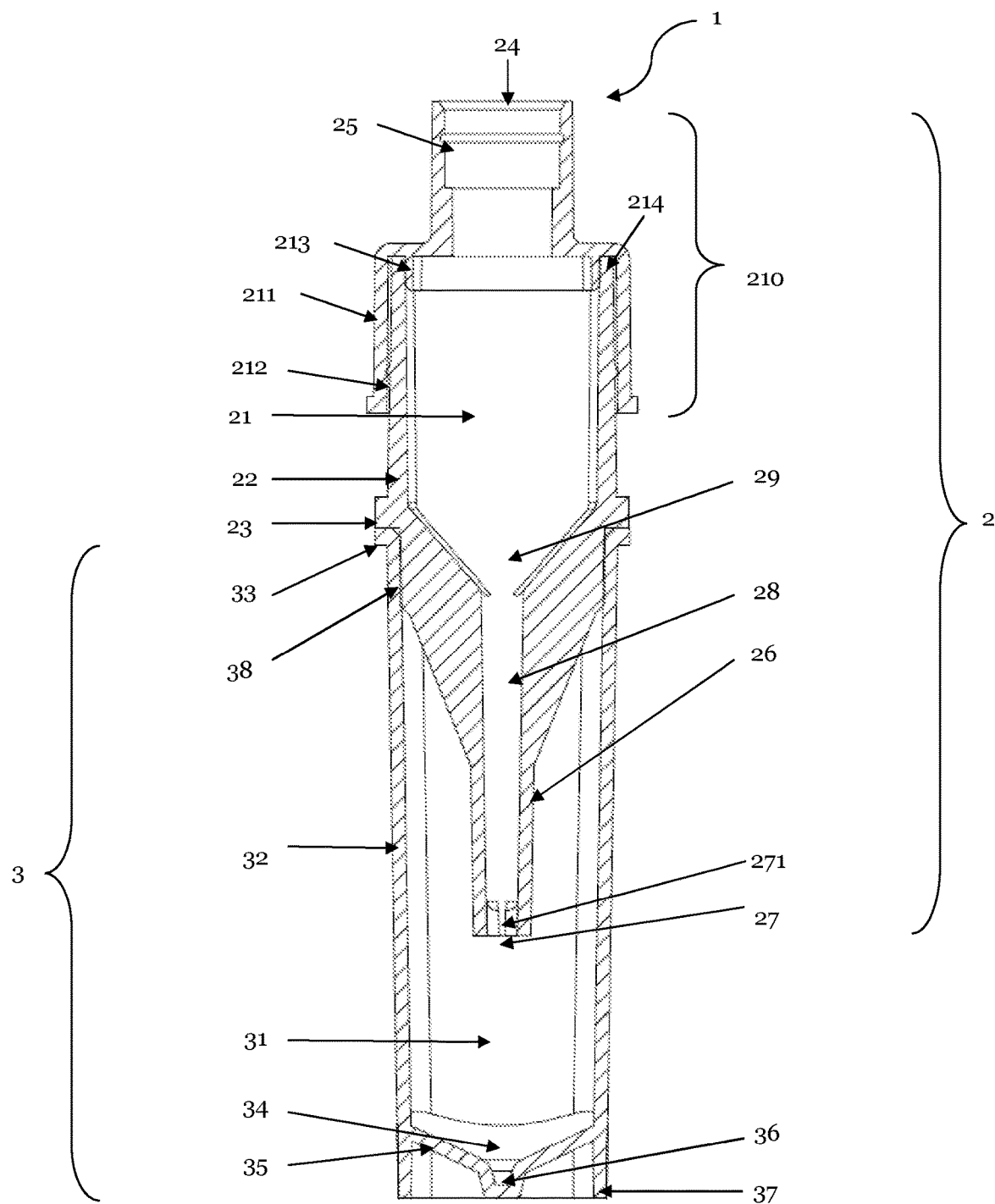
FIGS. 2a to c: show schematic representations of a container according to the present invention.

FIG. 2a shows a device according to an embodiment of the present invention in the form of a filtration unit 1 which has a column 2 and a container 3. In different embodiments, the filtration unit 1 (and its column and container 2 and 3, respectively) can have a substantially cylindrical or rectangular shape. In different embodiments, the device can only comprise a column 2, in that case it may be adapted to be coupled to a rack or a reservoir. The column 2 and container 3 of one filtration unit 1 are designed so that they can be assembled together or with any other counterparts from another filtration unit 1 of the same type, for instance a column 2 can be assembled successively with different containers 3.

Suitable material for the filtration unit 1 includes among other: polypropylene, polyethylene, glass. In one embodiment, the filtration unit 1 is formed via injection molding. It is to be noted that in several embodiments, the various parts of the filtration unit 1 do not need to be made of the same material.

The column 2 of the filtration unit has an upper chamber 21 for containing one or more biological samples. This upper chamber 21 is formed by the cavity in the middle of one or more lateral walls 22 of the column 2. In an embodiment, the upper chamber 21 can be of a substantially cylindrical shape, thus forming a tube. At its upper end (above its upper chamber 21), the column 2 has an upper opening 24 for introducing the one or more biological samples into and flowing the one or more biological samples out of the upper chamber 21. The upper opening 24 can be provided in its vicinity with a pipetting channel coupling 25 (for connection with a pipetting channel of a laboratory automation system), and/or a cover (not show in FIG. 2a) for closing the upper opening, and thus sealing the upper end of the upper chamber 21. In one embodiment, this cover is an elastomer flap. The presence of a pipetting channel coupling 25 facilitates and eases the direct transfer of samples with pipetting channels instead of specific robotic arms. In either case, it should be specifically designed to match means of delivery samples, even directly vein-punctured.

The lower part of the upper chamber 21 forms a tapered portion 29, whose lateral walls are tapered, i.e. the distance between opposing walls (or the distance between opposing sides of one or more continuous lateral walls) gets smaller when moving in a downward direction (i.e from the top of the upper section to the bottom of the lower section). The tapered portion 29 ends with an opening oriented in the downward direction and opened toward an elongated channel 26, which is joined to the tapered portion 29. In some embodiments, the elongated channel 26 protrudes downwardly from the tapered portion 29 of the column 2. In a preferred embodiment, the elongated channel 26 comprises a filter element 4 (see FIG. 2b) which will be described in more details later in this description. In embodiments with a container 3, the elongated channel 26 may protrude into a container chamber 31 of the container 3. The length and diameter of the elongated channel 26 may be adapted to the type and method of sampling of a given biological sample, i.e. for instance for optimizing the filtration results. For example, in some embodiments, the elongated channel 26 may be long enough to accommodate a filter element 4 in the form of a column filter element. The elongated channel 26 ends at its lower side with a lower opening 27 to enable discharge of a part or parts of the biological sample that was contained in the upper chamber 21. This lower opening 27 may be comprised of a constricting means 271, with a pre-defined spacing that is large enough for allowing the flow of unfiltered biological sample. The constricting means 271 may comprise tapered and angled slopes extending within the elongated channel 26. Alternatively, the constricting means 271 may be a porous filter.

Preferably, the column 2 of the filtration unit 1 is made in one piece, for example by means of injection molding. However, in some embodiments, the column 2 may comprise a main body and a lid part 210. The lid part 210 may be produced separately from the reminder of the column 2 (also called the "main body"), wherein each part may be produced by injection molding, and then be assembled. This embodiment has proven to be easy to manufacture and to be cost-efficient.

The lid part 210 may be positioned at the upper end of the column 2. It may comprise lateral walls 211, substantially parallel to the lateral walls 22 of the column 2. The lateral walls 211 are preferably surrounding the lateral walls 22 of the upper section, and may be connected to them by a friction force. In one embodiment, a connection notching 212 is provided for connecting the main body of the column 2 to the lid part 210. This connection notching 212 may be placed on the lateral walls 211 of the lid part 210 or on the lateral walls 22 of the column 2. This connection notching 212 may be placed between the lateral walls 22 and 211 to replace or supplement the friction force maintaining the lid part 210 connected to the main body of the column 2. The lid part 210 may further comprise internal walls 213 substantially parallel to the lateral walls 211 and positioned at the upper end of the main body of the column 2, so that when the lid part 210 is connected to the main body of the column 2, the internal walls 213 and the lateral walls 211 form a slot 214 into which the upper part of the lateral walls 22 of the main body of the column 2 may be clamped, thus ensuring an even more stable connection between the main body of the column 2 and the lid part 210, and ensuring a better sealing of the upper chamber 21.

For rectangular shaped filtration units 1, the outer surface of the column 2 may comprise anchor protrusions 23, preferably in pairs of two, four, eight etc. The protrusions allow the column 2 to be reliably positioned onto the container 3 of the filtration unit 1 or compatible racks.

The container 3 of the filtration unit 1 may comprise an open upper end, through which the lower part of the upper section can be entered. The container 3 may comprise a container chamber 31 for collecting for instance separated sample fluid. The container chamber 31 is defined by the spaced formed between the open upper, one or more lateral walls 32 of the container, and a bottom end 34. The lower chamber 31 may also be cylindrical or rectangular. Most preferably, it has the same shape as the column 2 to which it is designed to be attached.

At its upper opened end, the container 3 may have a flange 33 around its opening (at the top end of the lateral walls 32), for receiving the one or more protrusions 23 of the column 2, and ensuring the connection between the column and container of the filtration unit 1. Such a flange 33 also has the advantage of easing the handling for the detachment and/or positioning onto a centrifuge and/or automated handling system and/or to be positioning on compatible racks.

The bottom end 34 of the lower chamber 31 may be provided with one or more bottom walls 35 forming a tapering portion (i.e. the distance between opposing walls— or the distance between opposing sides of one or more continuous lateral walls—gets smaller when moving in a downward direction). The bottom end 34 may be further provided with a reduced trap portion 36 at the lower end of the bottom walls 35. In an exemplary embodiment, the container may also include a lid to permit safe transportation of the container 3 and its contents received from the column 2 for further processing, and to reduce the risk of losing and/or contaminating the contents in container 3.

The container 3 may be further provided with one or more wall extensions 37, which extend the one or more lateral walls 31 of the container 3 in a substantially downward direction. These one or more wall extensions 37 are preferably configured to allow stable footing of the container on a plane surface, irrespective of whether the container is present attached to or separate from the column 2. For instance, these wall extensions 37 may extend at least as far downwardly as the one or more bottom walls 35 or the trap portion 26 of the container 3. These wall extensions 34 may have a substantially horizontal end surface, adapted to support them and ensure a stable contact with an external surface onto which the container 2 may be placed.

In the preferred embodiment, the column and container are designed in a detachable manner, wherein e.g. a reduced outer surface of the column 2 is smaller than the inner surface of the container 3, so that frictional force is applied when the column and the container are attached together. When the upper section 3 is attached with the container 3, the reduced outer surface of the column 2, the tapered portion 29 of the upper chamber 21 and the elongated channel 26 of column 2 are accommodated into the container chamber 31.

Figure 2B:
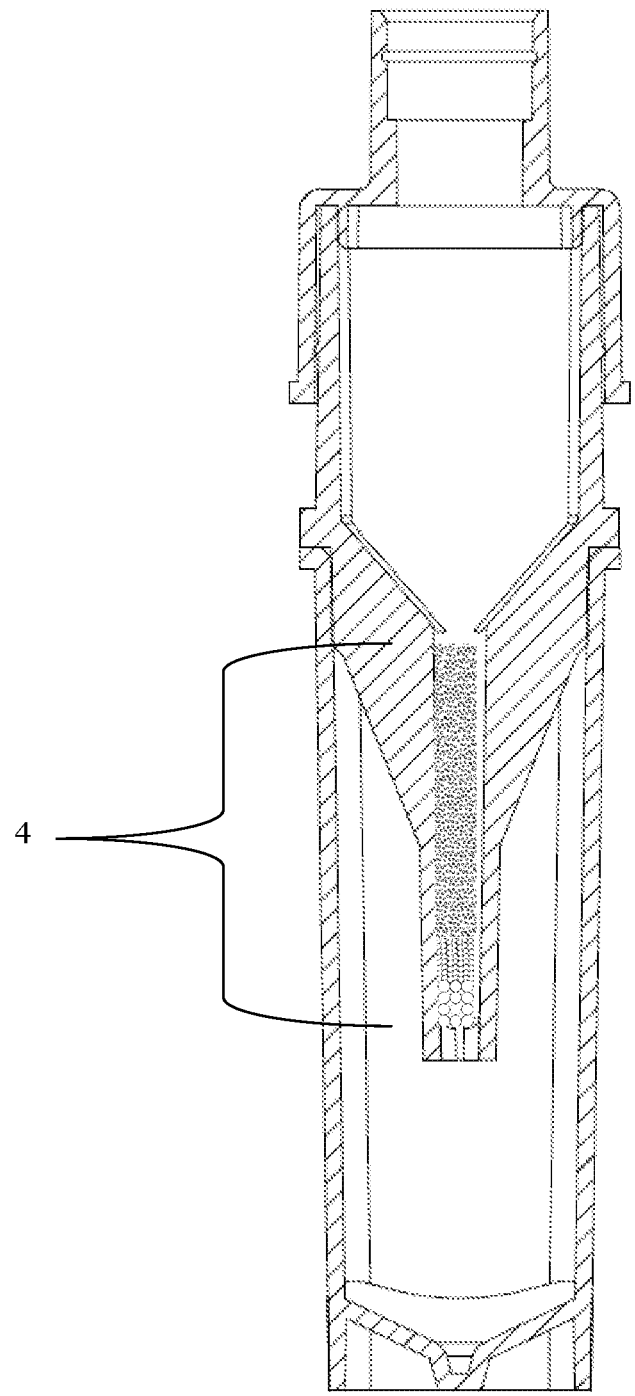
Figure 2C:
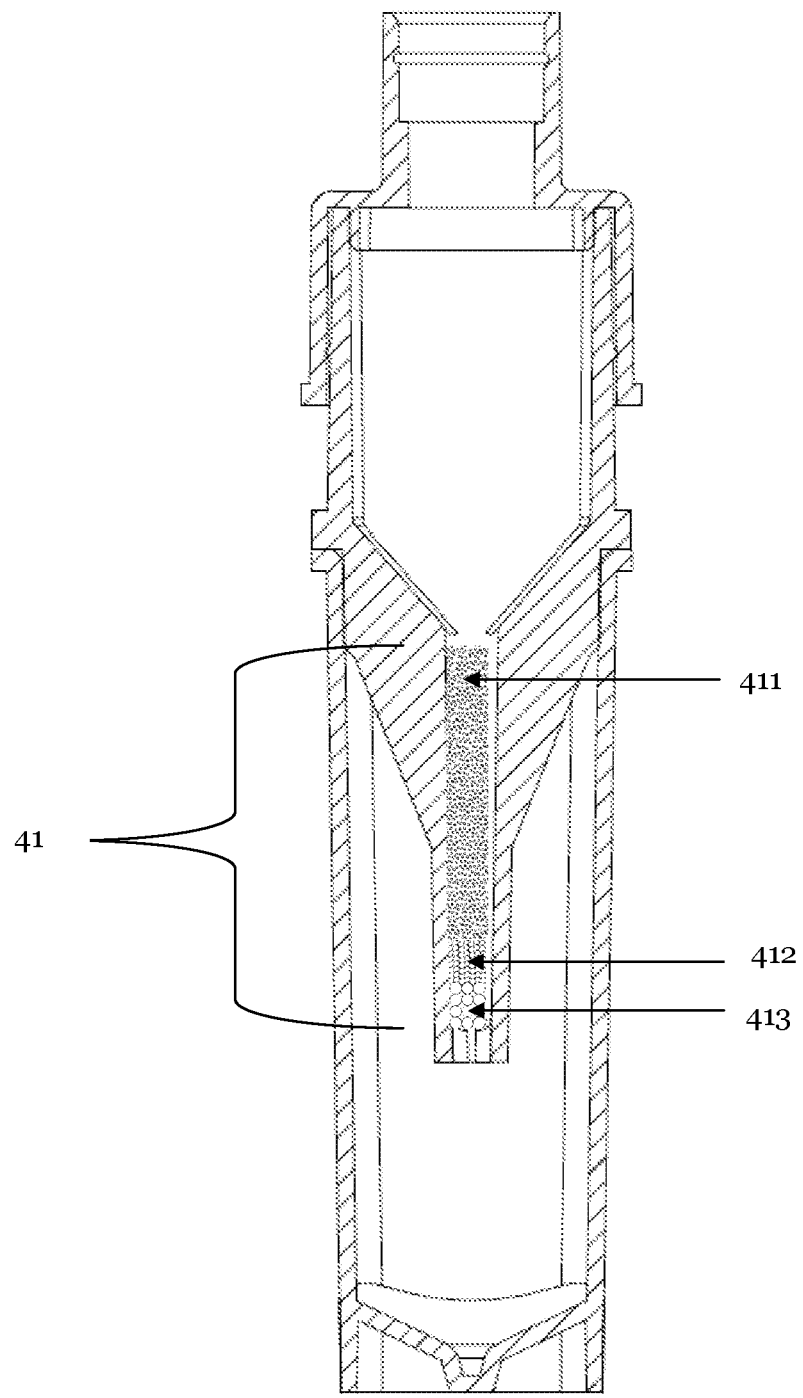

Referring to FIGS. 2b and 2c, the filter element 4 contained in the elongated channel 26 may be formed of a matrix 41 of microbeads 411 and 412, 413. In this case, one section comprises a plurality of microbeads 411 (upper section, i.e. "first section") and another section comprises a plurality of microbeads 412 (middle section). Further, one section comprises a plurality of microbeads 413 (lower section, i.e. "second section"), which is configured to retain the microbeads 411 and 412 in the column, while smaller particles (i.e. the "first portion of particles") and buffer can pass. Thus, the lower or "second" section comprising microbeads (413) of the microbeads matrix 41 is part of a constricting means to retain the above sections 411 and 412 in the column. In some embodiments, the elongated channel 26 of the column 2 has a substantially cylindrical inner surface which is filled with the microbeads matrix 41.

The microbeads matrix 41 according to the present invention refers to a size-continuous or size-discontinuous matrix of substantially non-compressible microbeads 101. The wording "size-continuous matrix" is intended to mean a gradual increase in size of microbeads 101. The wording "size-discontinuous" is intended to mean that the matrix comprises size-dependent microbeads sections, microbeads within each section have a specific diameter and are randomly diffused within the confinement of the elongated channel structure.

Non-limiting suitable non-compressible materials to be used for the microbeads 101 include stainless steel, magnetic, silica; insoluble and immiscible in blood and non-reactive therewith. Such microbeads 101 can also be made of other material, such as glass or ceramics, and/or one or more polymers, such as, for example, nylon, polytetrafluoroethylene (TEFLON™), polystyrene, polyacrylamide, sepharose, agarose, cellulose, cellulose derivatives, or dextran, and/or can comprise metals. Examples of microbeads 101 include, but are not limited to, magnetic isolation, magnetic particles, plastic particles, ceramic particles, carbon particles, glass isolation, metal particles, particles of complex compositions, microfabricated free-standing microstructures, etc.

In FIG. 2b, the column 2 of the filtration unit 1 is filled with a matrix 41 of microbeads which has three sections of microbeads 411, 412, and 413. While the section comprising a plurality of microbeads 411 acts as a filter, section 413 is part of the constricting means. As explained above, the microbeads in each of the sections of the microbeads 411, 412, and 413 may be preferably of substantially uniform size, i.e., comprising the distribution of diameters as usual for commercially available microbeads (cf. above). It is to be noted that the matrix 41 of microbeads may also have less sections (i.e. two or one) or more sections than the three sections disclosed in this illustrative example. The sections are arranged in layers, wherein the microbeads of the top layer have the smallest diameter (e.g. 80 μm), and the microbeads of the bottom layer have the largest diameter (e.g. 300 μm). The middle layer comprises microbeads with a diameter of for example 200 μm. The bottom layer is arranged at the lower opening of the column, such that the microbeads clog or constrict the aperture. The 80 μm sized microbeads of the top layer form effective interstices of about 10 μm and can be applied for separating CTCs, CICs and CTM.

Figure 3A:
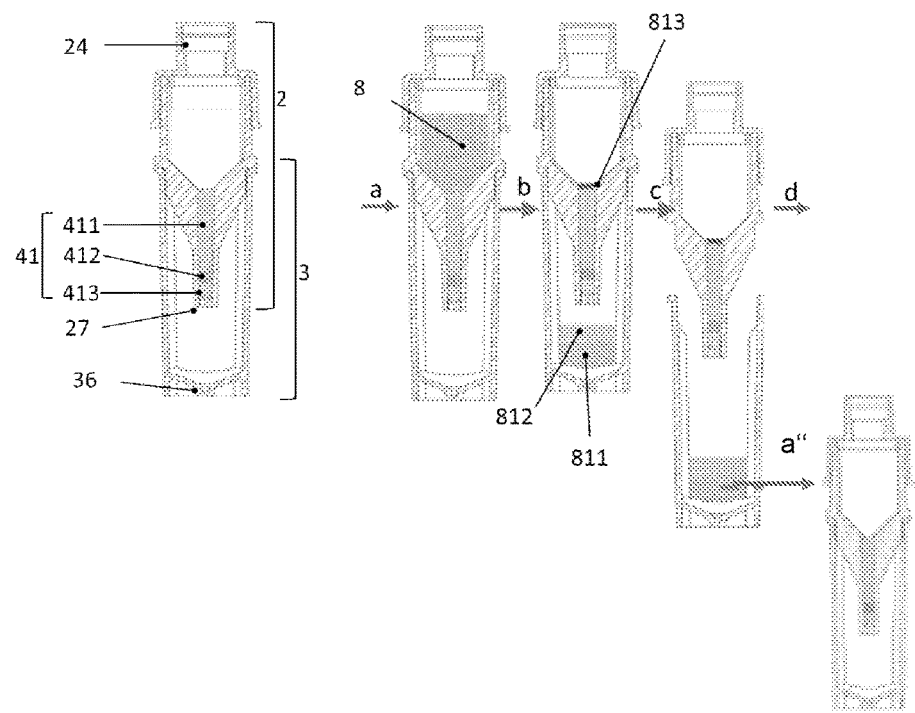
FIGS. 3a to c: show an illustration of a work-flow of the method according to the present invention.
Figure 3B:
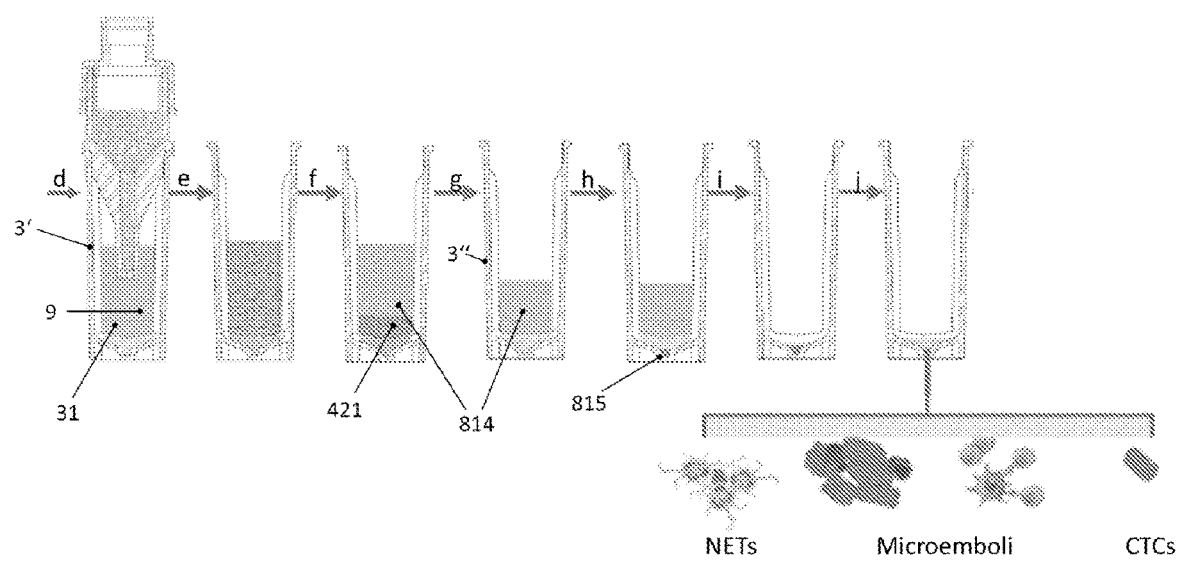
Figure 3C:
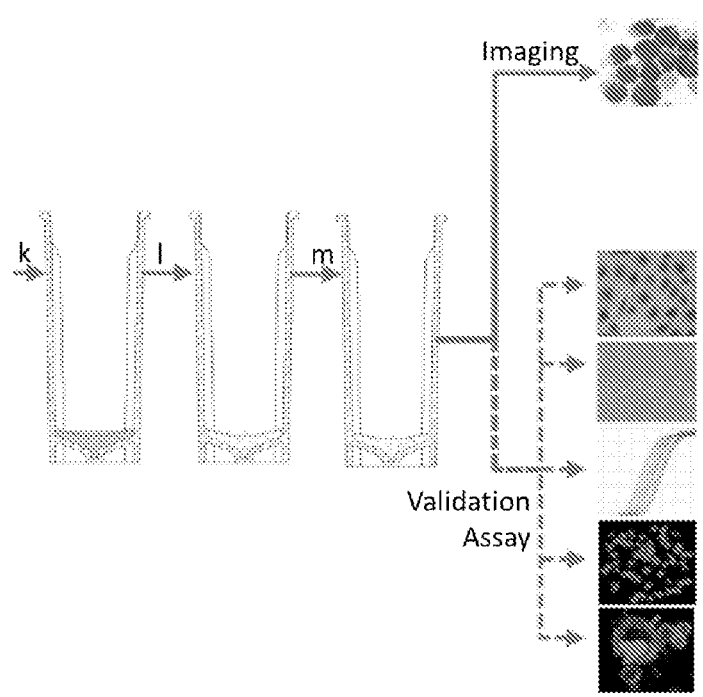

A mode of implementation of the method for isolation of circulating rare cells is illustrated in FIGS. 3a to c. The biological sample 8 may be for example a buffy coat or whole blood sample. The whole blood sample may be diluted or the biological particles of interest may be enriched by any means, before application of the sample onto the microbeads matrix. For example, the density gradient centrifugation methods described in PCT/CN2017/072654, filed on behalf of the present applicant, can be applied to enrich the biological particles in the sample before applying onto the filtration matrix.

All of the methods steps described in the following can be performed manually or in an automated liquid handling system.

In the example method of FIGS. 3 a to c, 2 ml whole blood is used as a sample fluid for detecting circulating tumor cells, circulating immune cells (CICs) and/or microemboli. The sample is first separated by a density gradient centrifugation, resulting in two fractions, i.e. approximately 1 ml of plasma and mononuclear cells (MNCs), and 1 ml of RBCs and heavy cells, and/or CTC/CIC/microemboli caught with the RBC. The fraction containing the RBC and heavy cells is then applied onto a filtration matrix 41 comprised in a column 2. The filtration matrix comprises three sections of uniformly sized microbeads 411, 412, and 413. The sections are arranged in layers, wherein according to a preferred embodiment the microbeads of the top layer have the smallest diameter (50 µm), and the microbeads of the bottom layer have the largest diameter (300-500 µm). The middle layer comprises microbeads with a diameter larger than 60 µm, preferably 100-220 µm. The 50 µm sized microbeads of the top layer form effective interstices of about 7.7 µm and can therefore be applied for separating CTCs, CICs and CTM. The bottom layer of microbeads clogs the lower opening of the column. Thereby, the upper layers of microbeads are stably positioned in the column above the bottom microbead layer.

Filling of the microbeads matrix into the column can be performed by pipetting microbead suspensions (e.g. microbeads in water or in 20% ethanol) consecutively into the column 2 through the upper opening 24, with each suspension comprising microbeads of a specific size. The suspension with the smallest microbeads ("first section") is pipetted into the column at last. The microbeads matrix can then be dried by centrifugation, and washed with buffer, e.g. PBS, before application of the biological sample.

In step a of FIG. 3a, the biological sample 8, optionally enriched after a density gradient centrifugation and potentially comprising CTCs, CICs and/or CTM is applied onto the microbeads matrix 41 through the upper opening 24. The biological sample 8 thereby slowly enters the first section, and biological particles that are larger than the interstice diameter of the first section, i.e. the top microbead layer, are retained. In step b of FIG. 3a, the column 2, which may be part of the filtration unit 1, and further may be positioned onto the container 3, is centrifuged for example at 5-20 g for 2 to 5 minutes, preferably 2 to 3 minutes. The centrifugation parameters may vary, depending on the sample and which biological particles are to be extracted. By centrifugation, the first portion of particles of the biological sample can run through the first section, as well as the microbeads of the other sections, including the second section at the lower opening of the column, and exit the column at the lower opening. In principle, gravity would suffice to allow the first portion of particles to pass the microbeads matrix, however, by centrifugation, the time for this passage can be reduced significantly. Such reduction in time is advantageous, as it reduces turn-around time and the likelihood that the particles of the biological sample are damaged during processing. After centrifugation, the fluid 812, e.g. blood plasma or the buffer used during enrichment of the biological particles, of the biological sample, and the first portion of particles 811, that have diameters or sizes below the critical size of 10 µm (i.e. the size of the interstices of the microbead layer with the smallest sized microbeads) have passed the microbeads matrix 41 with sections 411, 412, 413 and are collected in the container 3, while the second portion of particles 813 above the critical value, if any, are retained above or within the effective interstices of the microbeads. These particles of the second portion have sizes or diameters above 10 µm and are, therefore, trapped in the interstices of the smallest sized microbeads, i.e. the microbeads of the first section.

In step c of FIG. 3a, the container 3 and the column 2 are separated. The container 3, comprising the first portion of particles 811 below the critical value can be discharged or further processed, in particular by the method according to the invention. Thus, in step a" of FIG. 3a, the particles 811 can be applied onto a further column comprising a plurality of microbeads having a diameter, which is smaller than the diameter of the beads in section 411. For example, the column can comprise microbeads with a diameter of 40 µm forming the first section, thereby providing filtering interstices of about 6 µm. By applying the first portion of particles to such column, a further separation into a fraction of particles, that have a size or diameter above 6 µm, and a fraction of particles, having a size below 6 µm, can be achieved.

The second portion of particles, trapped in the interstices of the matrix 41 of microbeads can be further processed according to the method of the present invention. In step d of FIG. 3b, the matrix 41 of microbeads and the second portion of particles are suspended in a buffer solution. For example, 2 ml PBS can be sufficient to form a suspension of particles and microbeads. By suspending the particles and the microbeads, the defined structure of the sections 411, 412 and 413 is lost, and the particles are released from the first section 411 into the buffer solution. This procedure ensures that all particles being trapped can now be isolated from the suspension, while being in a physiological, aqueous environment.

According to one of the preferred embodiments according to the invention, the column 2 of the filtration unit 1 comprising the matrix 41 of microbeads and the trapped biological particles is transferred onto a container 3', which is filled with a buffer solution 9, e.g. 2 ml PBS. In this case, the lower opening 27 of the column 2 of the filtration unit 1 is immersed in the buffer solution in the container 3'. By aspirating the buffer solution into the column 2 via the lower opening 27 and repeated dispensing with a pipetting channel, the matrix 41 of microbeads is disrupted at least to a large extent. In particular, the bottom layer of the microbeads matrix comprising large microbeads to initially constrict the lower opening, i.e. to act as a constricting means, is disrupted and mixed with the smaller microbeads of the other microbead layers. Thus, the lower opening is no longer clogged by the larger microbeads, and the biological particles and the smaller microbeads can enter the container chamber 31 of the container 3' through the lower opening 27 of the column 2.

According to one embodiment of the present invention, the microbeads of the second section, i.e. the microbeads with the larger diameter that clog the lower opening to act as a constricting means, are magnetic. Thereby, by placing the column 2 of the filtration unit 1 through or aside of a magnetic element, the magnetic microbeads are pulled away from the lower opening 27 and facilitate passing of the biological particles of the second portion of particles and smaller (non-magnetic) microbeads of the first section. The second portion of particles and the microbeads of the first section are thus collected in a second container 3' (step e of FIG. 3b).

Alternatively, the lower opening 27 of the column 2 may be sealed, e.g. with a lid that fits onto the lower opening. In this case, the buffer solution 9 is applied through the upper opening 24 of the column 2 of the filtration unit 1 and the matrix 41 is suspended in the buffer solution by repeated dispensing and aspiration. This results at least in a partial disruption of the matrix 41. The trapped biological particles are thus released into the buffer solution, and microbeads, particles and the buffer solution form a suspension in the column. The suspension is then aspirated and transferred to a second container 3' (step e of FIG. 3b).

In principle, the process of suspension and aspiration can be repeated so that all targeted particles are extracted from the filtration matrix.

In step f of FIG. 3b, the second container 3' is centrifuged to allow separation of the microbeads 421 from the suspension 814 comprising the second portion of particles. For example, the container can be centrifuged at 200 g for 5 seconds, which allows complete separation of the microbeads and the particles due to the density and/or size difference. Alternatively, the separation of the particles and the microbeads can be achieved by means of gravity. Due to the density and/or size difference, the microbeads eventually settle at the bottom of the container, while the particles remain in solution. Furthermore, the container can be pre-filled with a separation gel or mineral oil with a lighter density than the microbeads part of the solution. This ensures that no particles are trapped in the microbeads pellets, thereby improving the overall capture efficiency. Moreover, use of a separation gel or mineral oil allows for an easy aspiration of the particles, as a distinct separation line is formed. This is important, for example, to ensure purity for downstream application.

After the microbeads have been separated from the suspension, the suspension 814 comprising the second portion of particles can be transferred to a further container 3" (step g of FIG. 3b). This transferring step can be performed manually or by means of an automated liquid handling system. In the following step h of FIG. 3b, the suspension may be centrifuged at least at 100 g for 1 minute to pellet the targeted particles 815. For example, the container may comprise a reduced trap portion 36, where the pellet of particles forms. Such a trap portion can facilitate complete removal of the solution, e.g. by pipetting of decanting (step i of FIG. 3b). After removal of the solution, the particles can be suspended in a further buffer (step j of FIG. 3b). The particles can be suspended, for example, in appropriate buffers for staining or immune-affinity assays. Thus, the centrifugation step h of FIG. 3b allows an effective buffer exchange, streamlining any further down-stream assays. Alternatively, after step f, the second portion of particles may be directly transferred to a downstream assay, such as microscopic analysis, without transferring to a new container, concentrating, and buffer-exchange.

FIG. 3c exemplifies different downstream processes. The second portion of particles can be, for example, stained (step k of FIG. 3c), washed (step 1 of FIG. 3c), suspended (step m of FIG. 3c) before being analyzed by morphology imaging or other validation assays. These assays allow quantification of the particles, e.g. CTCs or CICs, in the sample.

Advantageously, multiple columns 2 and containers 3 can be processed in parallel, and easily integrated in automated liquid handling platforms. Thereby, throughput can dramatically increase. Moreover, the sample can be split during the method according to the invention. As explained above, the first filtrate comprising the first portion of particles can be further processed, such as by a further separation method or directly by validation assays. On the other hand, the second portion of particles, e.g. comprised in the suspension 814, can be further processed, e.g. by applying the suspension to another column comprising a first section or a microbeads matrix with interstices that are larger than the interstices of the first section 411 of the microbeads matrix 41. For example, a first section that effectively filters at a critical size of 18 μm can be used to separate particles below and above this size.

Figure 4A:
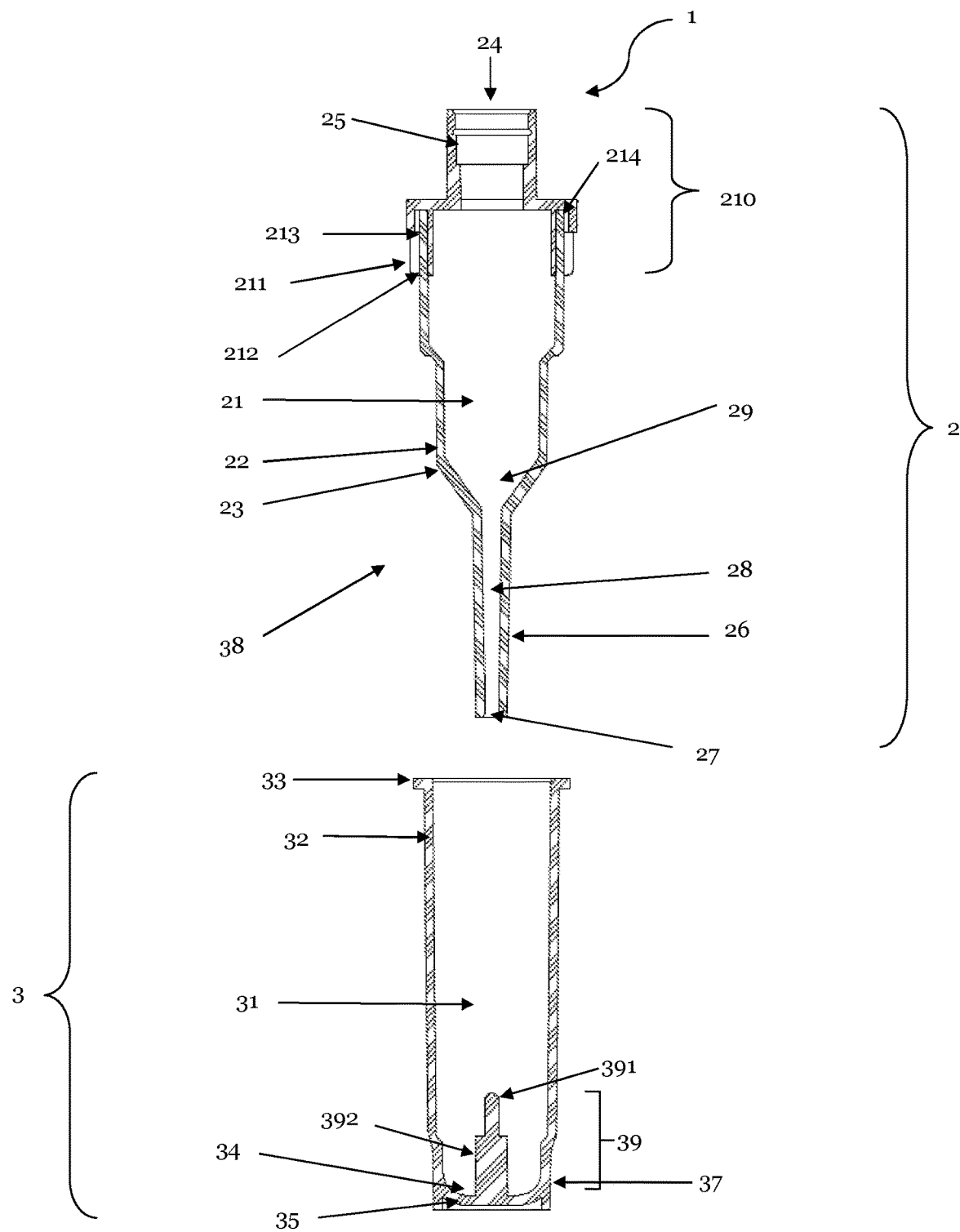
FIGS. 4a to e: show schematic representations of a container according to the present invention.

FIG. 4a shows a further device according to a preferred embodiment of the present invention in the form of a filtration unit 1 with a column 2 and a container 3. As described above for FIG. 2a, the filtration unit 1 (and its column and container 2 and 3, respectively) can have a substantially cylindrical or rectangular shape. The device can only comprise a column 2, in that case it may be adapted to be coupled to a rack or a reservoir. The column 2 and container 3 of one filtration unit 1 are designed so that they can be assembled together or with any other counterparts from another filtration unit 1 of the same type, for instance a column 2 can be assembled successively with different containers 3. Suitable material for the filtration unit 1 includes among other: polypropylene, polyethylene, glass. The filtration unit 1 may be formed via injection molding. It is to be noted that in several embodiments, the various parts of the filtration unit 1 do not need to be made of the same material.

According to this embodiment, the column 2 of the filtration unit, the upper chamber 21, the one or more lateral walls 22, anchor protrusions 23, the upper opening 24, the pipetting channel coupling 25, the tapered portion 29, the elongated channel 26, which is joined to the tapered portion 29, the lower opening 27 are formed as described for FIG. 2a. The elongated channel 26 may contain a filter element 4, as described above for FIGS. 2b and 2c (see FIG. 4b).

As described for FIG. 2a, the column 2 of the filtration unit 1 can be made in one piece, for example by means of injection molding, or the column 2 may comprise a main body and a lid part 210.

The lid part 210, its lateral walls 211, a connection notching 212, internal walls 213 and a slot 214 may be provided as described for FIG. 2a.

The container 3 of the filtration unit 1 may comprise an open upper end, through which the lower part of the upper section can be entered. The container 3 may comprise a container chamber 31, one or more lateral walls 32 of the container, a flange 33, bottom walls 35, one or more wall extensions 37, as described for FIG. 2a.

The bottom end 34 of the lower chamber 31 may be provided with a centered protrusion 39 with an upper portion 391 and a lower portion 392. The centered protrusion 39 is provided to fit through the lower opening 27 of the column 2 into the elongated channel 26, thereby preventing that the filtration matrix localized in the elongated channel 26 enters the container chamber 31. Preferably, a passage is formed between the lateral walls of the elongated channel and the lateral walls of the protrusion, which allows a liquid to flow through the passage and into the container chamber. Such passage may, for example, have a width of 10 to 40 μm, preferably about 20 μm. Thus, while liquid and smaller particles can flow from the column into the container chamber through the passage, larger particles, in particular microbeads above this size, are stably positioned in the column.

The container may also include a lid to permit safe transportation of the container 3 and its contents received from the column 2 for further processing, and to reduce the risk of losing and/or contaminating the contents in container 3.

In the preferred embodiment, the column and container are designed in a detachable manner, wherein e.g. a reduced outer surface of the column 2 is smaller than the inner surface of the container 3, so that frictional force is applied when the column and the container are attached together. When the upper section 3 is attached with the container 3, the reduced outer surface of the column 2, the tapered portion 29 of the upper chamber 21 and the elongated channel 26 of column 2 are accommodated into the container chamber 31. The centered protrusion 39 can then fit into the elongated channel 26.

Figure 4B:
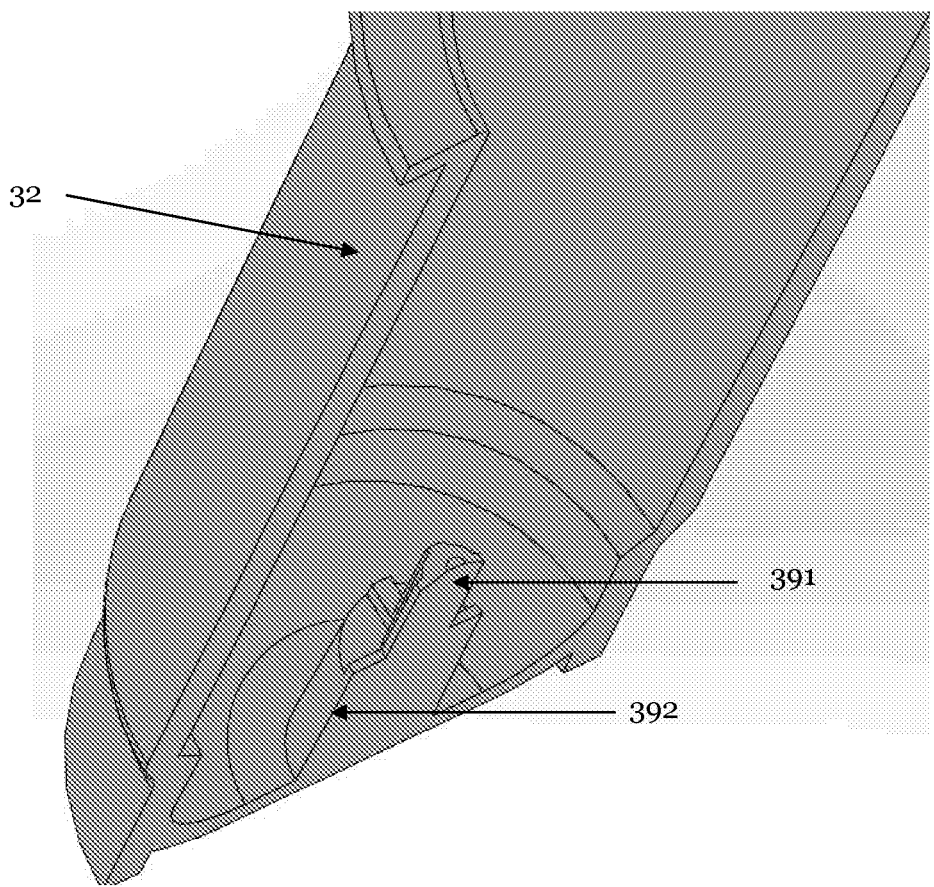

FIG. 4b illustrates a container 3, comprising a centered protrusion with an upper portion 391 and a lower portion 392. In this embodiment, the upper portion has a diameter that fits into the lower opening 27 of the elongated channel 26 (not shown), while the diameter of the lower portion 392 does not fit into the lower opening of the elongated channel, but supports the lateral walls of the lower opening. The lower portion 392 thereby acts as a holding device that ensures that the protrusion 39 does not completely fill the elongated channel 26.

Figure 4C:
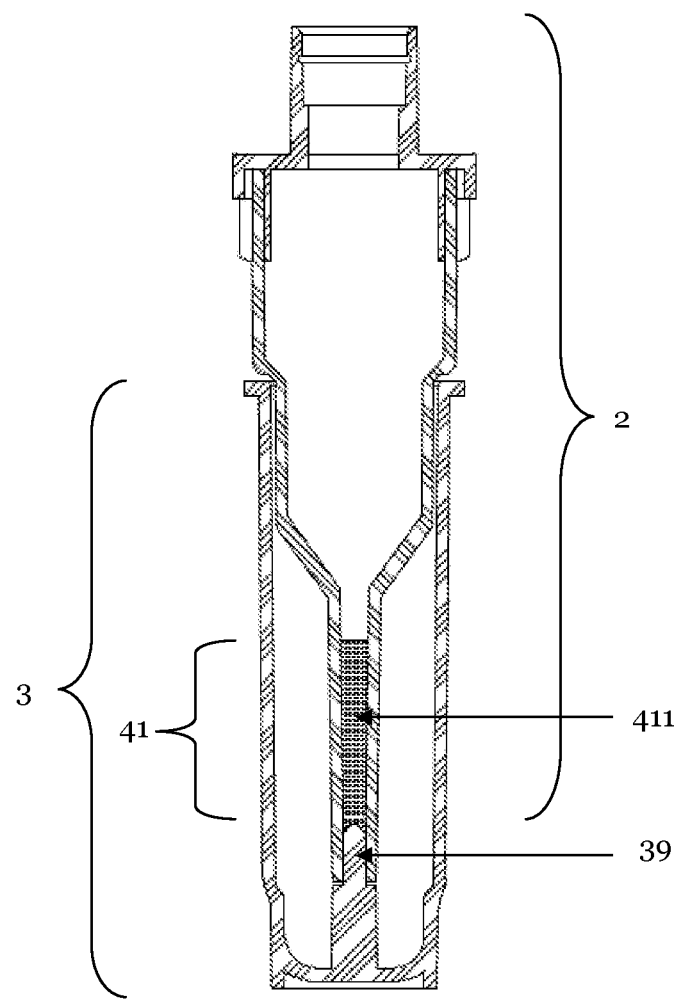

FIG. 4c illustrates a column 2 and a container 3, wherein the elongated channel 26 of the column 2 is filled with a matrix 41 of microbeads. The microbeads matrix 41 comprises one section of microbeads 411, which act as a filter. The centered protrusion 39 of the container 3 serves as a constricting means that prevents the microbeads of the first section to pass through the lower opening 27 of the elongated channel 26.

Figure 4D:
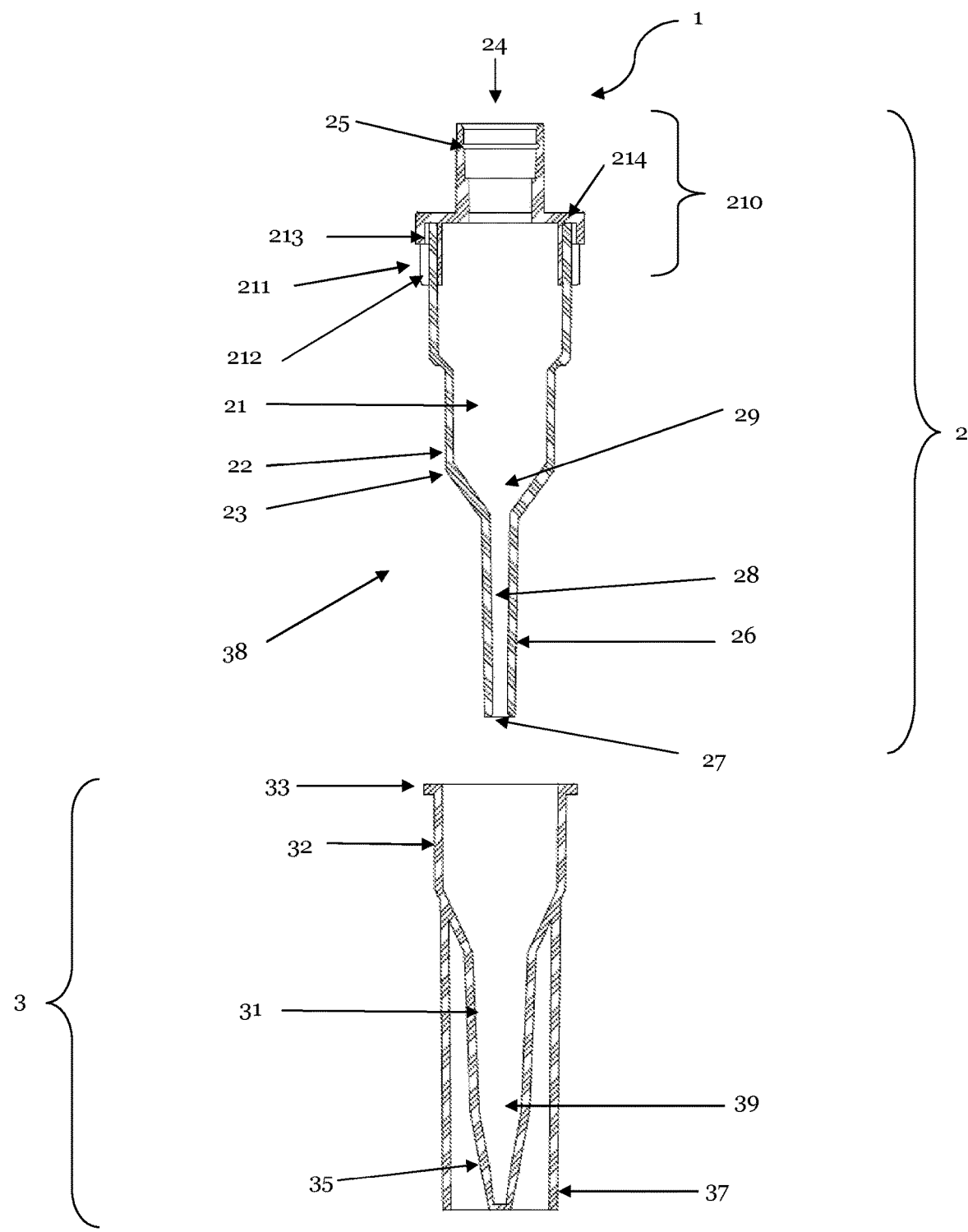

FIG. 4d illustrates a column 2 and a container 3 according to the invention. While the column 2 is provided as described for FIG. 4a, comprising an upper chamber 21, one or more lateral walls 22, anchor protrusions 23, an upper opening 24, a pipetting channel coupling 25, a tapered portion 29, an elongated channel 26, a lower opening 27 and a lid part 212, lateral walls 211, a connection notching 25, internal walls 213 and a slot 214, the container 3 comprises an open upper end, through which the lower part of the upper section can be entered, a container chamber 31, one or more lateral walls 32 of the container, a flange 33, bottom walls 35, one or more wall extensions 37, as described for FIG. 4a, but is devoid of a centered protrusion. Such container can be used for processing steps not requiring a constricting means, or for processing steps where a constriction means is provided in alternative forms, e.g. as second section of microbeads, plug, or porous filter positioned at the lower opening of column 2. The container 3 may be provided as described in FIG. 2. In particular, the bottom end 34 of the lower chamber 31 may be provided with one or more bottom walls 35 forming a tapering portion (i.e. the distance between opposing walls—or the distance between opposing sides of one or more continuous lateral walls—gets smaller when moving in a downward direction). The bottom end 34 may be further provided with a reduced trap portion 36 at the lower end of the bottom walls 35 (not shown).

Figure 4E:
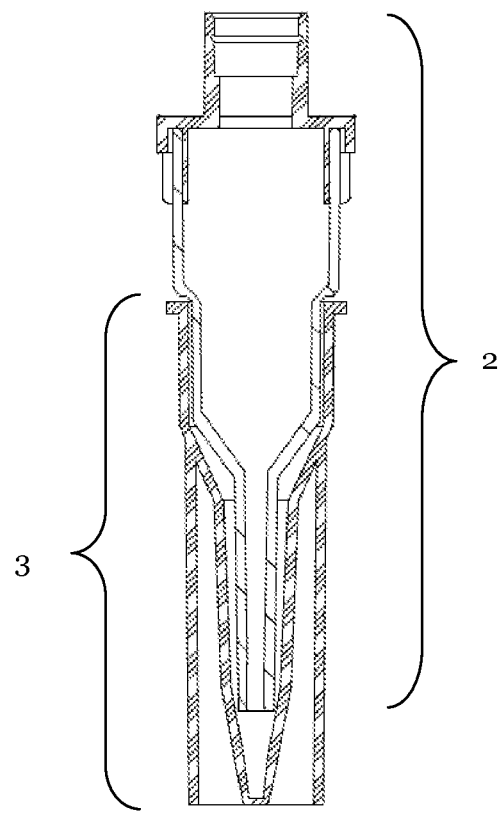

FIG. 4e illustrates a filtration unit 1 comprising a column 2 and a container according to FIG. 4d, wherein the column 2 is positioned on top of the container 3. As the container does not contain a protrusion, the lower opening of the column 2 is not blocked by the container, but rather does not contact walls of the container 3.

Figure 5A:
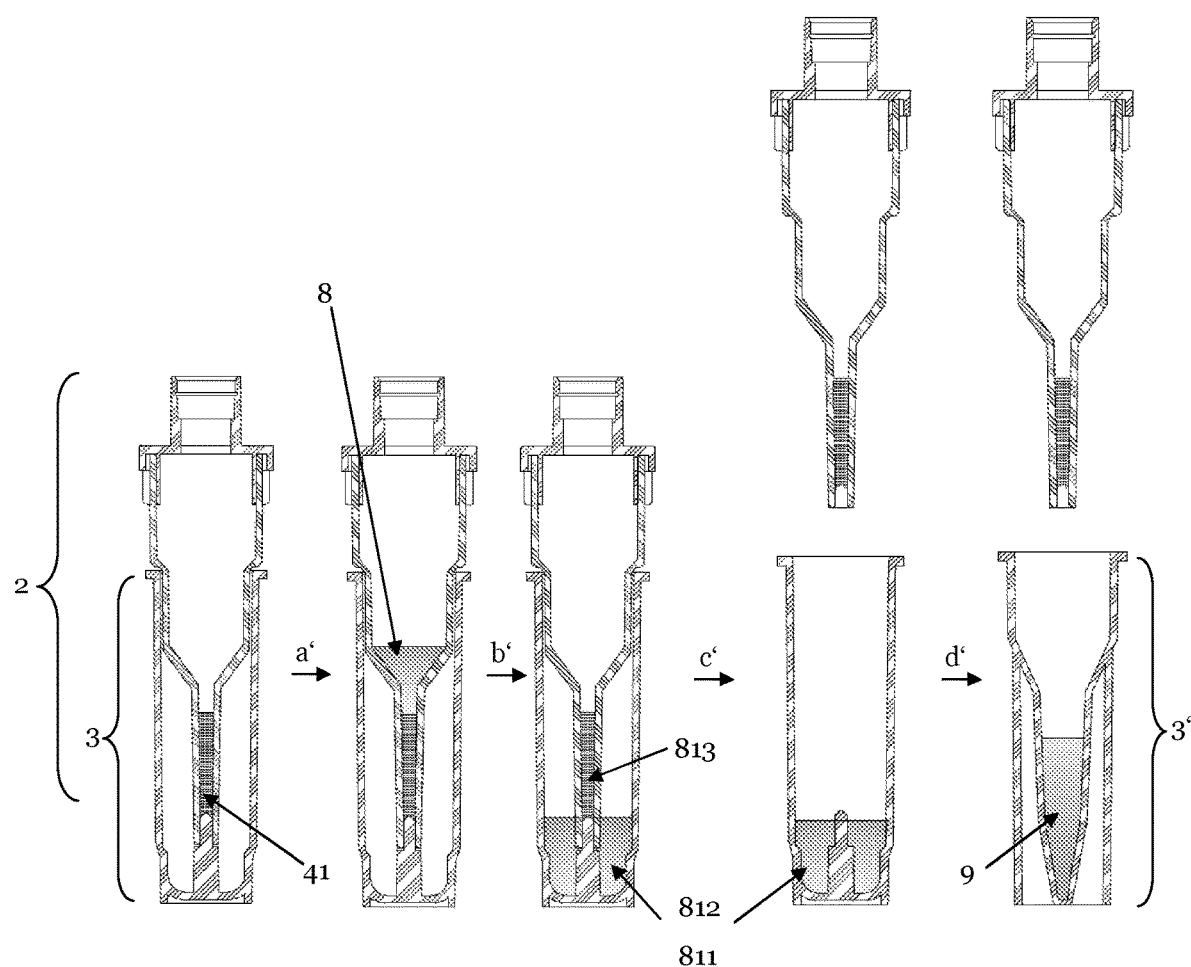
FIGS. 5a to c: show an illustration of a work-flow of the method according to the present invention.

In the example method of FIGS. 5a and b, the filtration unit according to FIG. 4a to e is applied. As described for FIG. 3a to c, 2 ml whole blood can be used as a sample fluid for detecting circulating tumor cells, circulating immune cells (CICs) and/or microemboli. After density gradient centrifugation, the fraction containing the RBC and heavy cells is then applied onto a microbeads matrix 41 comprised in a column 2. The microbeads matrix contains one section of uniformly sized microbeads. This section acts as a filter. The microbeads preferably have a diameter of about 50 μm, thereby forming effective interstices of about 7.7 μm. The protrusion of the container 3, acting as a constricting means, blocks the lower opening of the column and thereby retains the section of microbeads in the column. Preferably, a passage is formed between the lateral walls of the elongated channel and the lateral walls of the protrusion, which allows a liquid to flow through the passage and into the container chamber. Such passage may, for example, have a width of 10 to 40 μm, preferably about 20 μm. Thus, while liquid and smaller particles can flow from the column into the container chamber through the passage, larger particles, in particular microbeads above this size, are stably positioned in the column. The effective sealing of the lower opening of the column by the protrusion of the container in particular also facilitates the suspension step, wherein (after separation of the first portion of particles) the second portion of particles and the microbeads of the first section are suspended in buffer solution.

Filling of the section of microbeads into the column can be performed by pipetting microbead suspensions (e.g. microbeads in water or in 20% ethanol) consecutively into the column 2 through the upper opening 24. The section can then be dried by centrifugation, and washed with buffer, e.g. PBS, before application of the biological sample, in order to prevent formation of air bubbles. Moreover, by centrifugation a dense and compact matrix is obtained. Filling can be done by the same automated liquid handling system.

In step a' of FIG. 5a, the biological sample 8, optionally enriched after a density gradient centrifugation and potentially comprising CTCs, CICs and/or CTM is applied onto the microbeads matrix 41, i.e. the first section comprising a plurality of microbeads, through the upper opening 24. The biological sample 8 thereby slowly enters the microbeads matrix, and biological particles that are larger than the interstice diameter of the microbeads are retained at the top of the microbeads matrix. In step b' of FIG. 5a, the column 2, which may be part of the filtration unit 1, and further may be positioned onto the container 3, is centrifuged, at 5-20 g for 2-5 minutes, preferably 2-3 minutes, depending on the sample. Thereby, the first portion of particles of the biological sample can run through the microbeads matrix, exit the column at the lower opening, and run through the passage formed between the lateral walls of the elongated channel of the column and the protrusion of the container. In principle, gravity would suffice to allow the first portion of particles to pass the microbeads of the section, however, by centrifugation, the time for this passage can be reduced significantly. After centrifugation, the fluid 812, e.g. non-targeted particles or the buffer used during enrichment of the biological particles, of the biological sample, and the first portion of particles 811, that have diameters or sizes below the critical size of 10 μm (i.e. the size of the interstices of the microbead section) have passed the microbeads matrix 41 and are collected in the container 3, while the second portion of particles 813 above the critical value are retained above or within the effective interstices of the microbeads. These particles of the second portion have sizes or diameters above 10 µm and are, therefore, trapped in the interstices of the microbeads.

In step c' of FIG. 5a, the container 3 and the column 2 are separated. The container 3, comprising the first portion of particles 811 below the critical value can be discharged or further processed, in particular by the method according to the invention, as described for FIG. 3a, step a".

The second portion of particles, trapped in the interstices of the microbeads matrix 41 can be further processed according to the method of the present invention. In step d' of FIG. 5a, the column 2 of the filtration unit 1 comprising the microbeads matrix 41 and the trapped biological particles is transferred onto a container 3', which is filled with a buffer solution 9, e.g. 2 ml PBS. In this case, the container 3' does not comprise a centered protrusion, but is formed to accommodate the elongated channel of the column such that the lower opening of the elongated channel is not blocked by any wall of the container 3' when the column 2 is positioned onto the container 3'. Transferring can be in particular performed, when the microbeads matrix is substantially dry. The lower opening 27 of the column 2 of the filtration unit 1 is immersed in the buffer solution in the container 3' (FIG. 5b, step e').

Figure 5B:
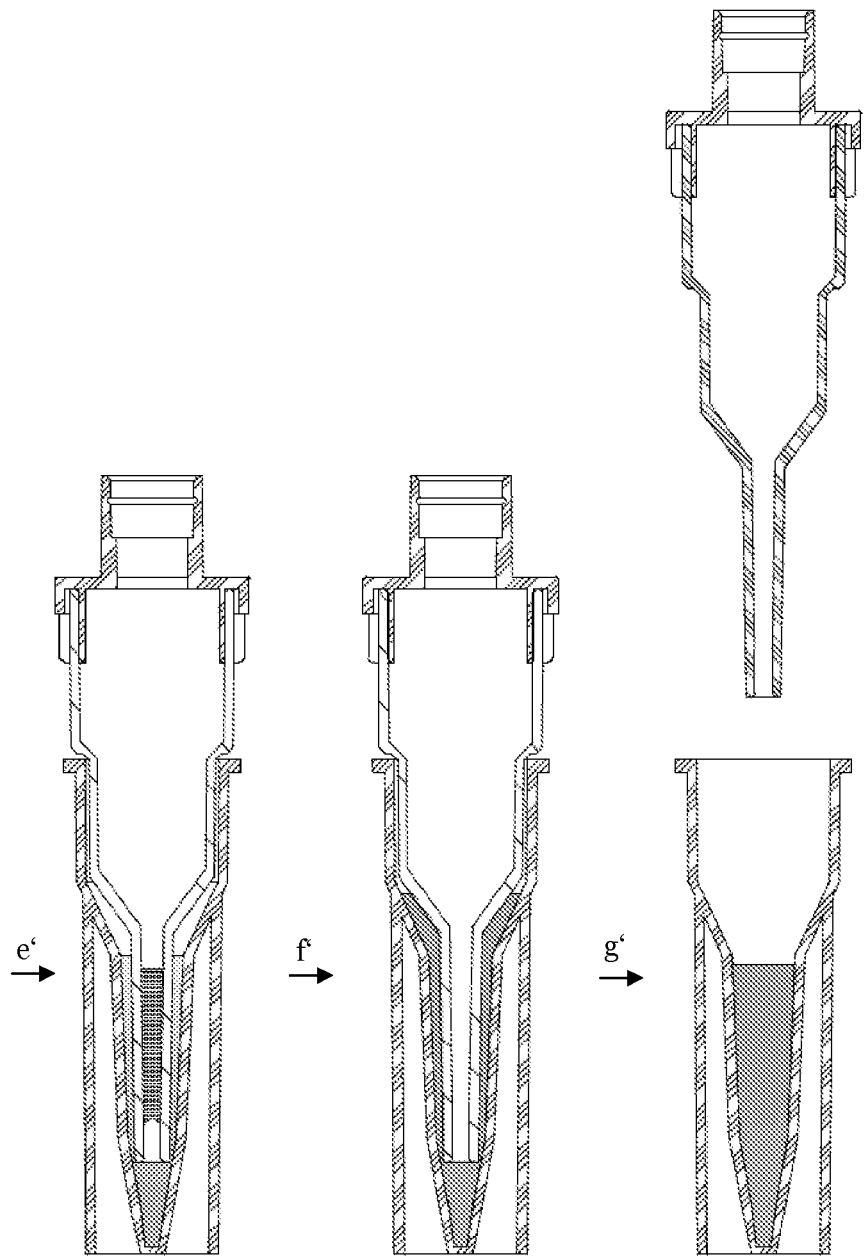
Figure 5C:
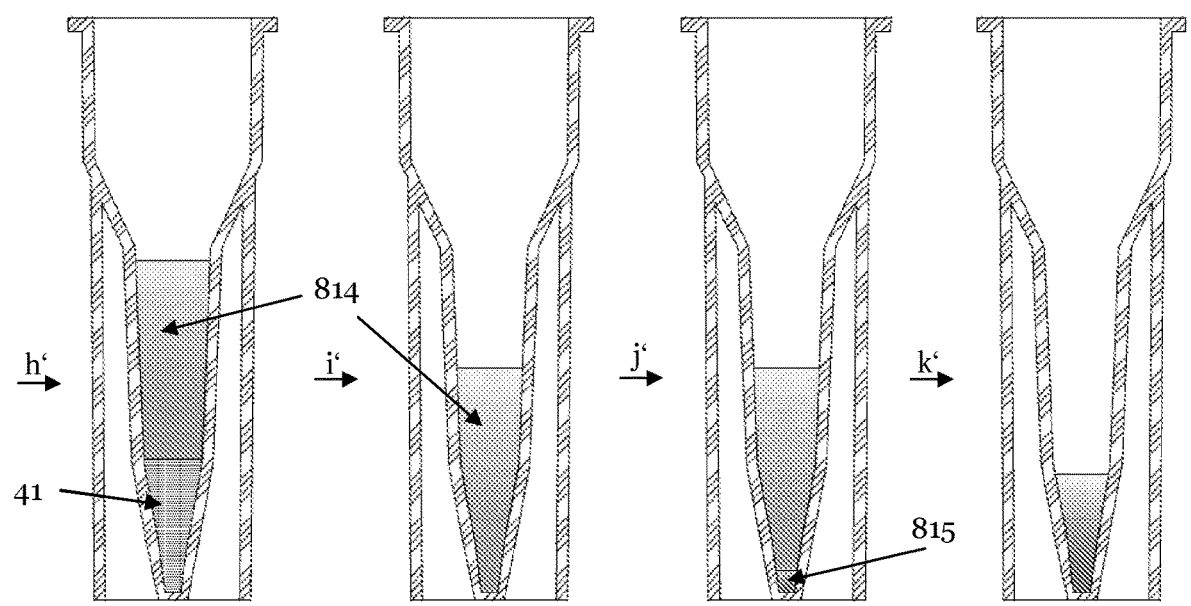

As shown in FIG. 5b, step f, the filtration matrix and the trapped particles can enter the container chamber of the container 3'. The buffer solution may furthermore be aspirated into the column 2 via the lower opening 27 and repeatedly dispensed with a pipetting channel to ensure that the microbeads matrix 41 is disrupted and exits the column through the lower opening. Thereby, the biological particles and the microbeads of the first section can enter the container chamber 31 of the container 3' through the lower opening 27 of the column 2 and form a suspension.

The empty column is then removed from the container (step g').

Further processing of the sample in step h' to separate the microbeads from the sample can be performed as described above for FIG. 3b, step f. Processing of the sample in step i' to transfer the separated second portion of particles from the microbeads to a new container can be performed as described above for FIG. 3b, step g. Concentrating the second portion of particles at the bottom of the container, e.g. by centrifugation, in step j' can be performed as described above for FIG. 3b, step h. Removing the supernatant and resuspending the second portion of particles in an appropriate buffer in step k' can be performed as described above for FIG. 3b, steps i and j. Finally, process steps k to m as described above for FIG. 3c can be performed. Alternatively, and as explained above for FIG. 3b, after step f, the separated second portion of particles may be directly transferred to a downstream analysis, e.g. microscopic analysis.

Figure 6:
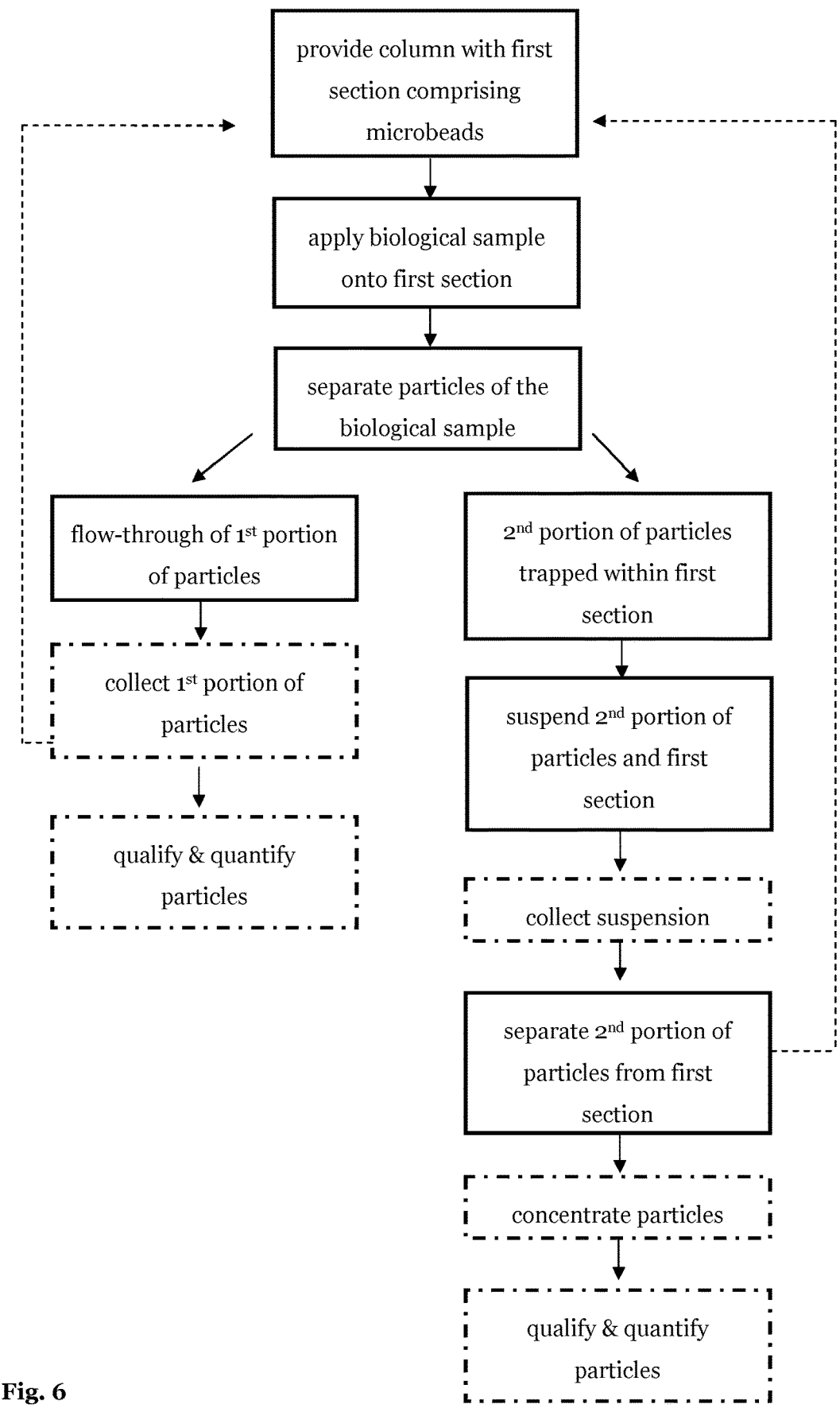
FIG. 6: shows an illustration of a work-flow of the method according to the present invention.

FIG. 6 illustrates a general work-flow for the method of this invention. At first, a column is provided comprising at least a first section of microbeads. A biological sample is then applied to the first section, and the particles in the sample are separated from each other. The first portion of particles passes the filtration matrix and is collected in the flow-through. The second portion of particles remains in the interstices of the first section. The separation can be achieved by gravity or centrifugal force. The first portion of particles can be either discarded or collected. The collected first portion of particles can be applied onto a further column. The second portion of particles is suspended in a buffer solution. The suspension can be collected, for example by means of gravity or a centrifugal force. In the following, the second portion of particles is separated from the microbeads of the first section, e.g. by means of gravity or a centrifugal force. After separation, the particles may be concentrated and analyzed.

According to the invention, an automated liquid handling system may be capable of carrying out the work-flow as illustrated in FIG. 6. Modern laboratory equipment comprises the means of e.g. filling a column with microbeads forming a matrix, filling a column with a biological sample, positioning a column in a rack or centrifuge, means for aspirating a liquid sample, means for centrifugation, etc. Thus, according to the present invention, there may also be provided a computer program that is stored on a non-transitory computer readable medium and that contains instructions that, when executed by one or more processors of an automated liquid handling system, carries out the method according to any of the embodiments described herein. For example, the instructions may follow the work-flow as illustrated in FIG. 6.

Figure 7:
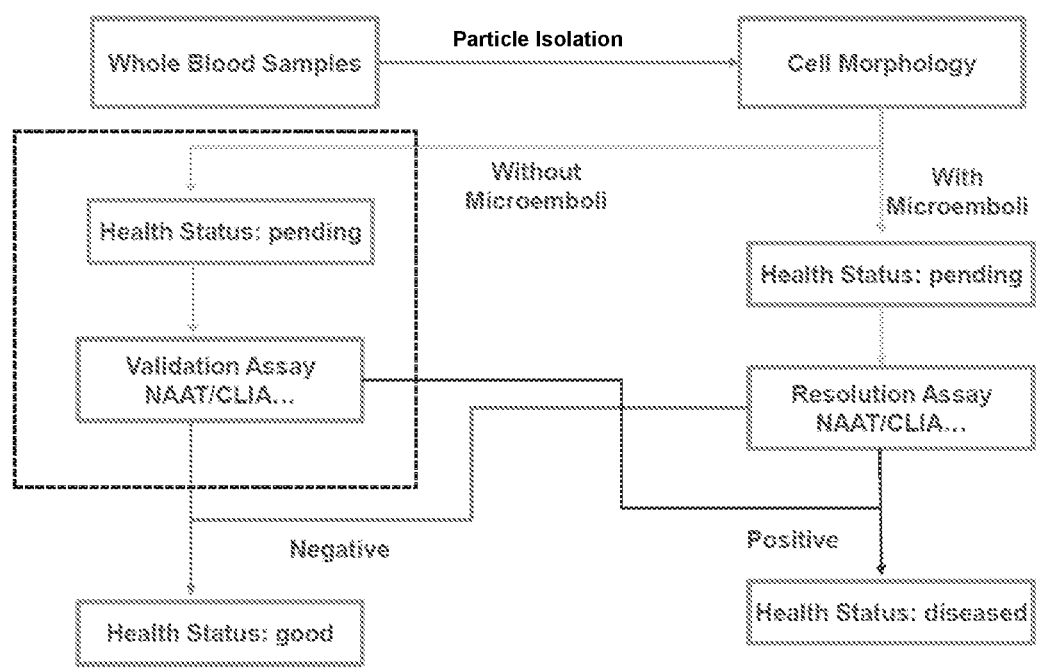
FIG. 7: shows an illustration of a health screen, which can make use of the method, the system, the column and the container according to the present invention.

FIG. 7 illustrates a health screen routine which can make use of the method according to the present invention. As a first step, whole blood samples are taken from the cancer patient, and particles are isolated according to the method of the present invention. The cell morphology of the isolated particles is analyzed by imaging. If microemboli are detected, further assays such as NAATs (nucleic acid amplification techniques) or CLIA (chemiluminescence immunoassays) are performed to validate the metastatic potential of the detected microemboli.

EXAMPLES

Size Distribution of Microbeads

Figure 8A:
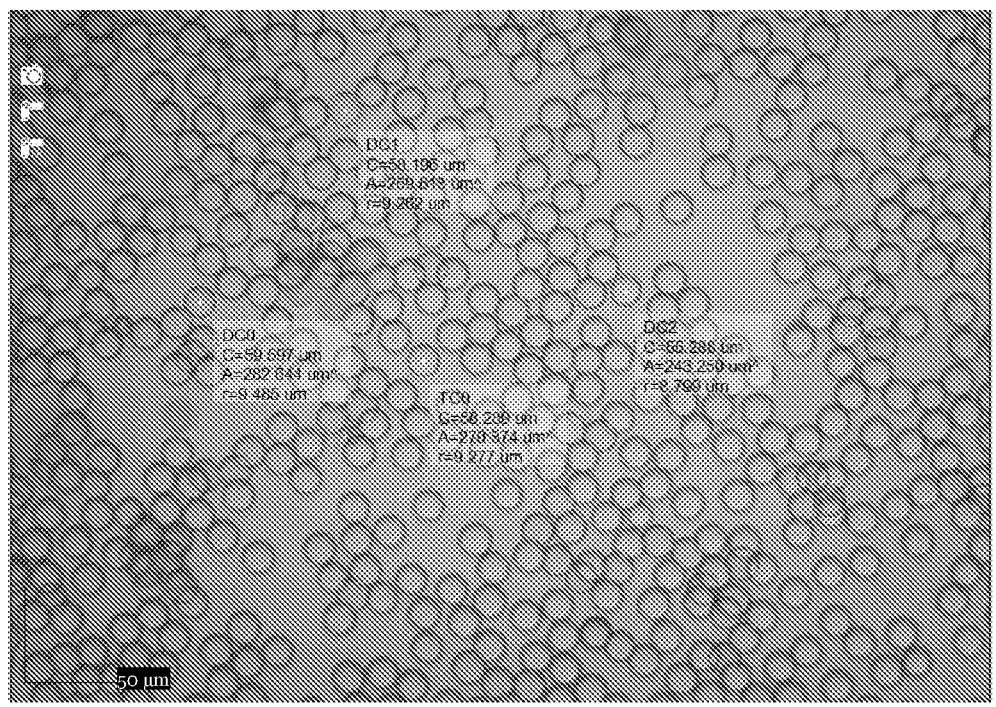
FIGS. 8a, b: show microscopic images (760× magnification) of silica beads of 20 µm average diameter (a) and 30 µm average diameter (b).
Figure 8B:
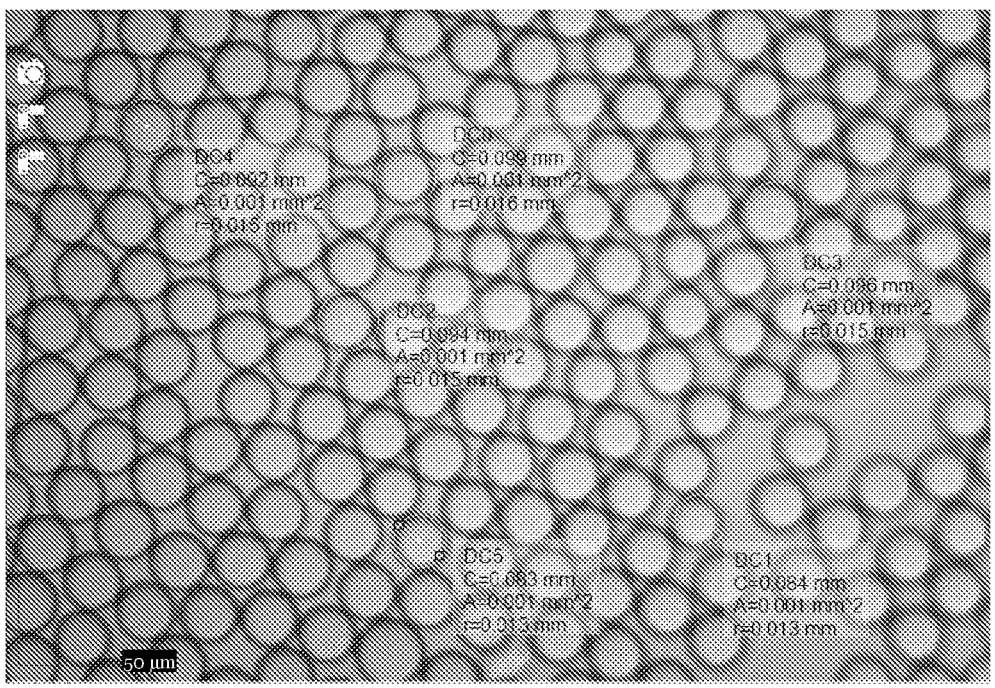

In order to quantify the size distribution of commercially available microbeads, silica beads with average diameters of 20 µm and 30 µm were analyzed by light microscopy. As shown in FIG. 8a and FIG. 8b, image analyses were performed on several imaged microbeads (assuming perfectly circular microbeads), illustrating a deviation of about 1 µm to 2.4 µm in diameter for beads having an average diameter of 20 µm, and of up to 4 µm for beads having an average diameter of 30 µm, respectively.

Filter Performance on Buffy Coat

Four columns, each comprising an elongated channel with the lower opening formed as a cross to support microbeads, were prepared by filling each column with a microbead matrix composed of three layers. For all columns, the bottom layer was formed from 500 µm sized microbeads, and the middle layer was formed from 220 µm sized microbeads. The microbeads of the top layers were of size 20 µm (column ID W1031-20), 30 µm (column ID W1031-30), 40 µm (column ID W1031-40) and 50 µm (column ID W1031-50) for the four columns, respectively, thereby providing interstice sizes of 3.1 µm, 4.6 µm, 6.2 µm and 7.7 µm.

Buffy coat was conventionally prepared by centrifugation (about 300 g for 15 minutes) of in total 8 ml whole blood that had been collected using an anticoagulant, e.g. EDTA, and that was split in four centrifugation tubes. In total 840 µl of the buffy coat layer was aspirated from the four tubes and pooled. A 20 µl sample was taken, and the cell content (white blood cells (WBC), red blood cells (RBC), platelets (PTL)) was analyzed with a Sysmex XS-500i system. The remaining isolated buffy coat layer sample was split into four 200 µl aliquots, and each aliquot was pipetted onto one of the above referenced four microbead matrix columns. The four columns were centrifuged at less than 20 g for 2 minutes and each flow-through was collected for analysis with the Sysmex XS-500i system. These flow-through samples contained the first portion of particles of the buffy coat layer sample. After centrifugation, 200 µl buffer solution (PBS) was pipetted onto each microbead matrix, dispensed and aspirated several times to form a suspension of microbeads and the second portion of particles in the buffer solution. The suspensions were transferred to four new containers, and the containers were centrifuged at 50 g for 3 minutes in order to separate the second portion of particles from the microbeads. Samples were taken from the supernatants containing the second portion of particles and subsequently analyzed with the Sysmex XS-500i system.

Cell concentrations, as obtained from the Sysmex XS-500i analysis, are compiled in Table 3.

The results in Table 4 give a more differentiated view on the filtration efficiency of the microbeads matrix versus cell populations. The filtration efficiency is not equal for all cell types within the group of WBCs, but rather varies significantly for columns with 30 and 40 µm sized microbeads. While neutrophils are retained to 83% and monocytes to

TABLE 3

Cell concentrations (white blood cells (WBC), red blood cells (RBC), platelets (PTL)) for the buffy coat sample, the flow-through after the first centrifugation (first portion of particles), and the supernatant after the second centrifugation (second portion of particles).

| | Composition of buffy coat | | | | | Composition of second portion of particles | | | Composition of first portion of particles | | |
|---|---|---|---|---|---|---|---|---|---|---|---|
| | WBC $10^9$/L | RBC $10^{12}$/L | PLT $10^9$/L | Column ID | Volume | WBC $10^9$/L | RBC $10^{12}$/L | PLT $10^9$/L | WBC $10^9$/L | RBC $10^{12}$/L | PLT $10^9$/L |
| Average diameter (µm) | 6.2-9.4 | 7-8.5 | 2-4 | | | | | | | | |
| Cell concentration | 15.41 | 0.06 | 1693 | W1031-20 | 200 µl | 14.24 | 0.04 | 1198 | 0 | 0 | 571 |
| | | | | W1031-30 | 200 µl | 8.74 | 0.02 | 490 | 3.59 | 0.05 | 1380 |
| | | | | W1031-40 | 200 µl | 5.31 | 0.02 | 251 | 10.98 | 0.05 | 1467 |
| | | | | W1031-50 | 200 µl | 0.87 | 0.01 | 108 | 14.35 | 0.05 | 1584 |

As can be derived from the obtained cell concentrations before and after processing, the column comprising 20 µm sized microbeads in the top layer (column ID W1031-20) successfully retained white blood cells and red blood cells, while filtering out smaller sized platelets to a significant extent. Red blood cells were not retained by columns comprising larger microbeads with effective interstices of 40.6 µm, 6.2 µm and 7.7 µm (column IDs W1031-30, W1031-40, W1031-50). On the other hand, white blood cells were partially retained by columns with 30 µm and 40 µm sized microbeads. Considering the average sizes of the analyzed cell populations, these results demonstrate that the average diameter of the microbeads in the top layer determines the cut-off value for the filtration process. Furthermore, the data demonstrate that RBCs, which are able to deform and to squeeze through capillaries of only 3 µm in diameter (e.g. Jones et al., Measurement science in the circulatory system, Cell Mol Bioeng. 2014; 7(1):1-14)), are still retained in the microbeads matrix with 20 µm sized microbeads, providing interstices of 3.1 µm. Hence, the method is also suitable to enrich cells that are in general prone to deformation.

To further study the cell distributions with respect to the cell sizes, in the Sysmex XS-500i analysis tool the group of white blood cells was broken down into neutrophils, lymphocytes, monocytes and basophils. The results are compiled in Table 4.

even 96% by 30 µm sized microbeads, lymphocytes and basophils are only retained to 66% and 57%, respectively. Using microbeads of 40 µm diameter, the filtration efficiency for these four cell types ranges from 28% to 62%. Hence, it is possible to specifically enrich a certain cell population from a heterogeneous sample by choosing microbeads of a specific diameter.

Figure 9A:
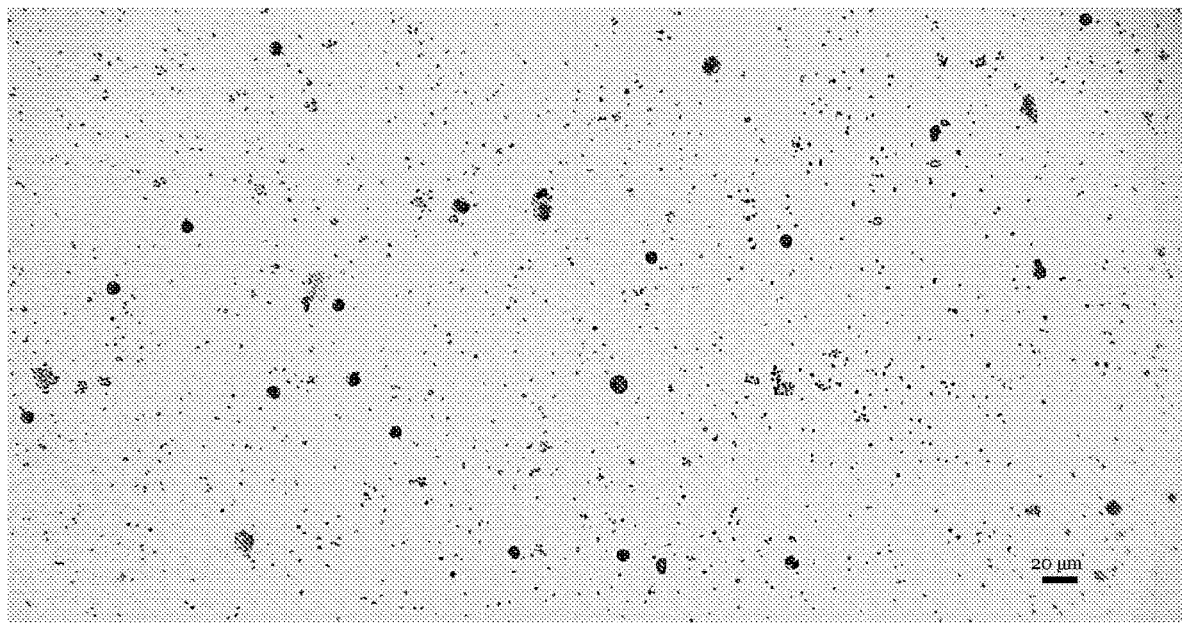
FIGS. 9a to g: show microscopic images of buffy coat sample (a), flow-through after application onto a 20 µm microbead matrix (b), separated particles after suspension of the 20 µm microbead matrix (c), flow-through after application onto a 50 µm microbead matrix (d), separated particles after suspension of the 50 µm microbead matrix (e), flow-through after application onto a 50 µm microbead matrix (f), and separated particles after suspension of the 50 µm microbead matrix (g) (FIG. a-e: 350× magnification; FIG. f, g: 760× magnification).
Figure 9B:
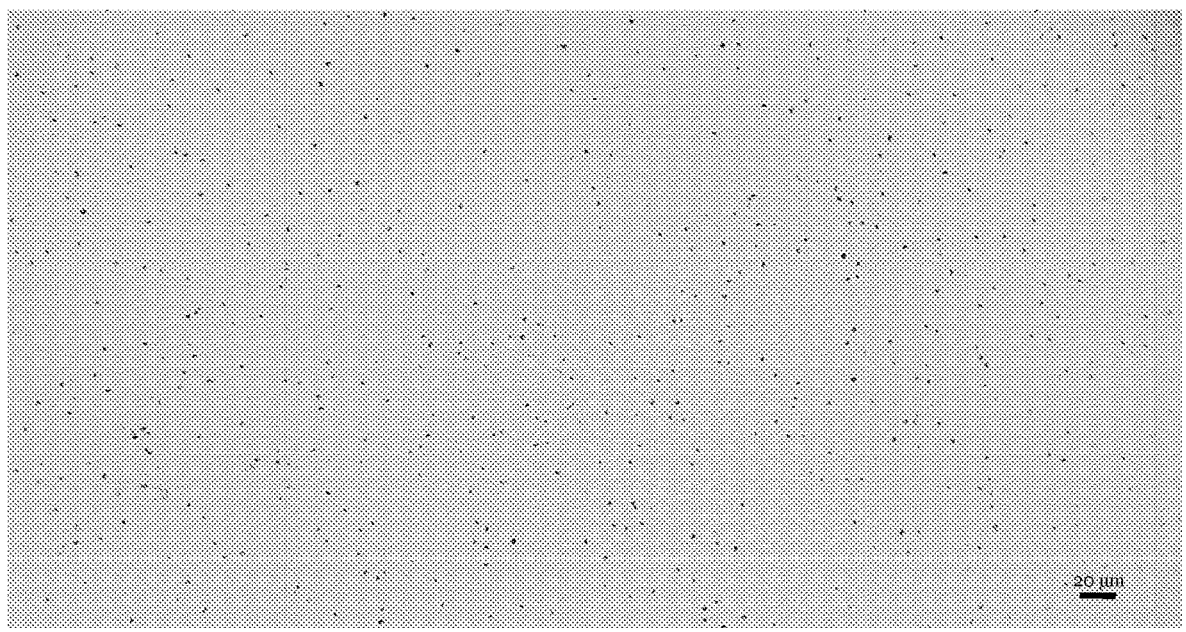
Figure 9C:
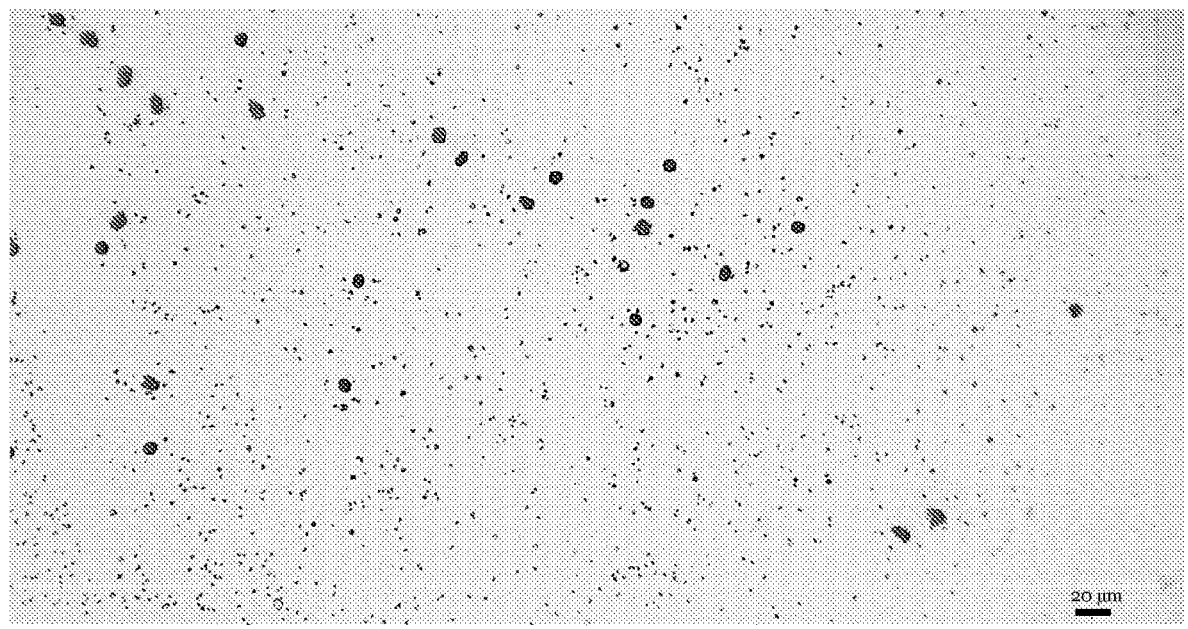
Figure 9D:
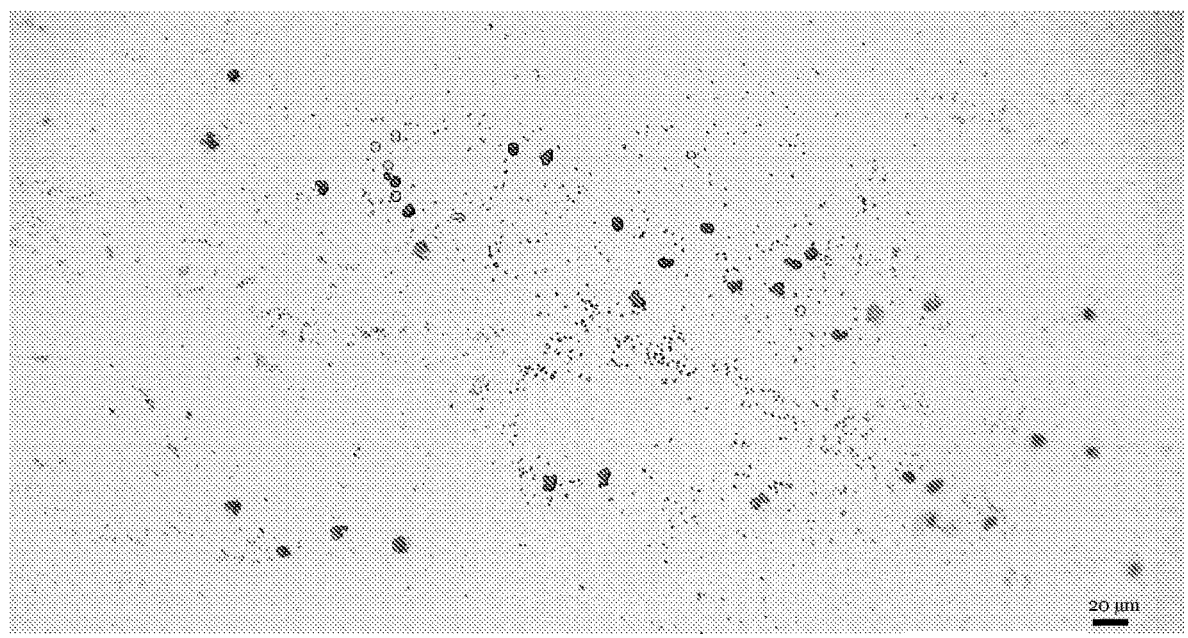

Samples of the buffy coat and the separated blood cells, as described in Tables 3 and 4, were also analyzed by light microscopy. For this process, the samples were transferred to new containers, centrifuged at 80 g for 5 minutes and the supernatant was discarded. The pelleted cells were resuspended in 50 µl buffer (PBS), stained with Romanowsky stain and 2 µl of each sample was pipetted onto a conventional microscope cover slip. FIG. 9a shows a microscope image of the buffy coat sample, as isolated from the whole blood sample by centrifugation. This sample contains a distribution of heterogeneously sized cells. FIG. 9b shows a microscope image of a sample, as obtained as flow-through after application of the buffy coat sample onto column W1031-20 and centrifugation. FIG. 9c shows a microscope image of a sample, as obtained after suspension of the trapped cells and the microbeads matrix of column W1031-20 and centrifugation. Compared to FIG. 9b, a significant amount of larger sized cells is observed in FIG. 9c, thereby qualitatively confirming the results of Table 3. FIG. 9d shows a microscope image of a sample, as obtained as

TABLE 4

Cell concentrations (neutrophils (NEUT), lymphocytes (LYMPH), monocytes (MONO), basophils (BASO)) for the buffy coat sample, the flow-through after the first centrifugation (first portion of particles), and the supernatant after the second centrifugation (second portion of particles).

Figure 9E:
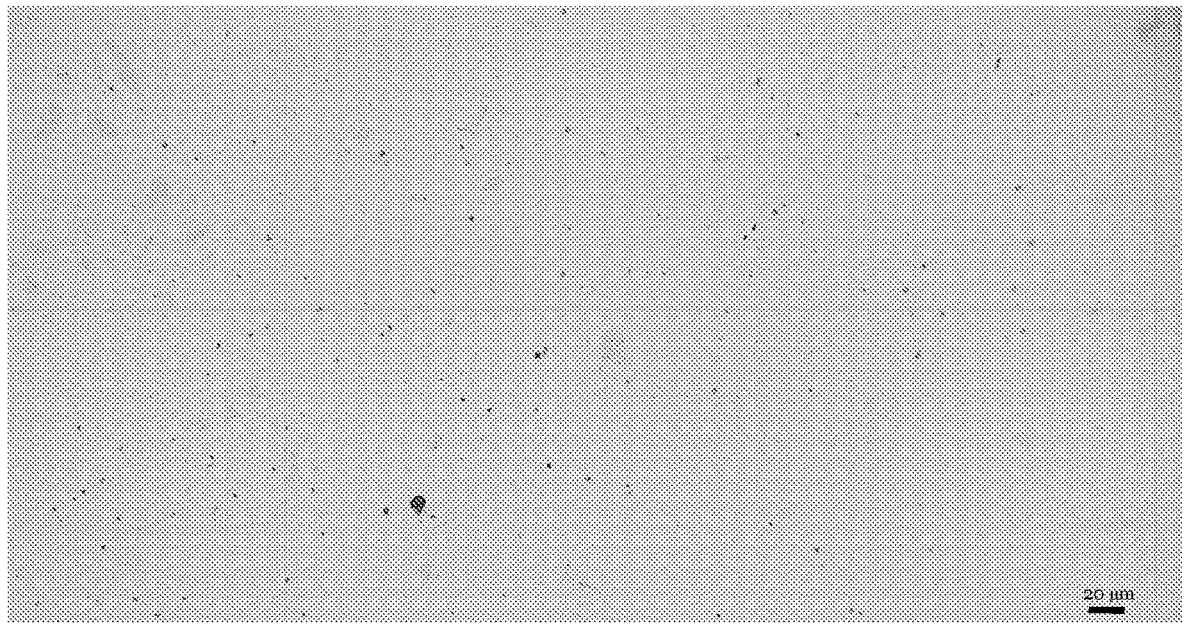
Figure 9F:
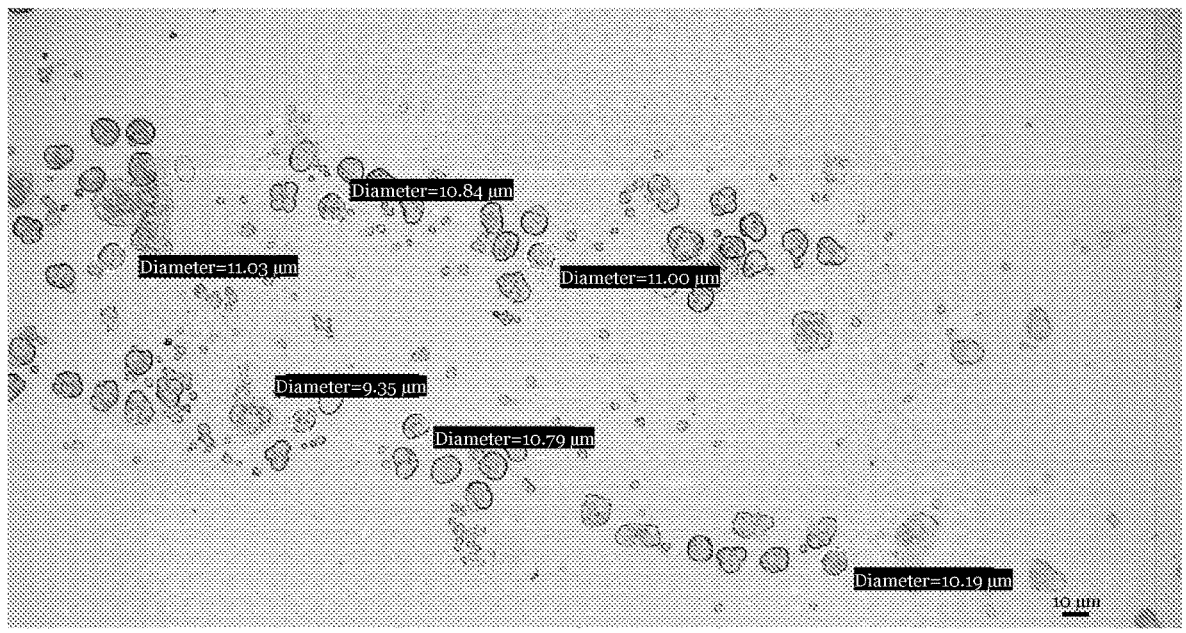
Figure 9G:
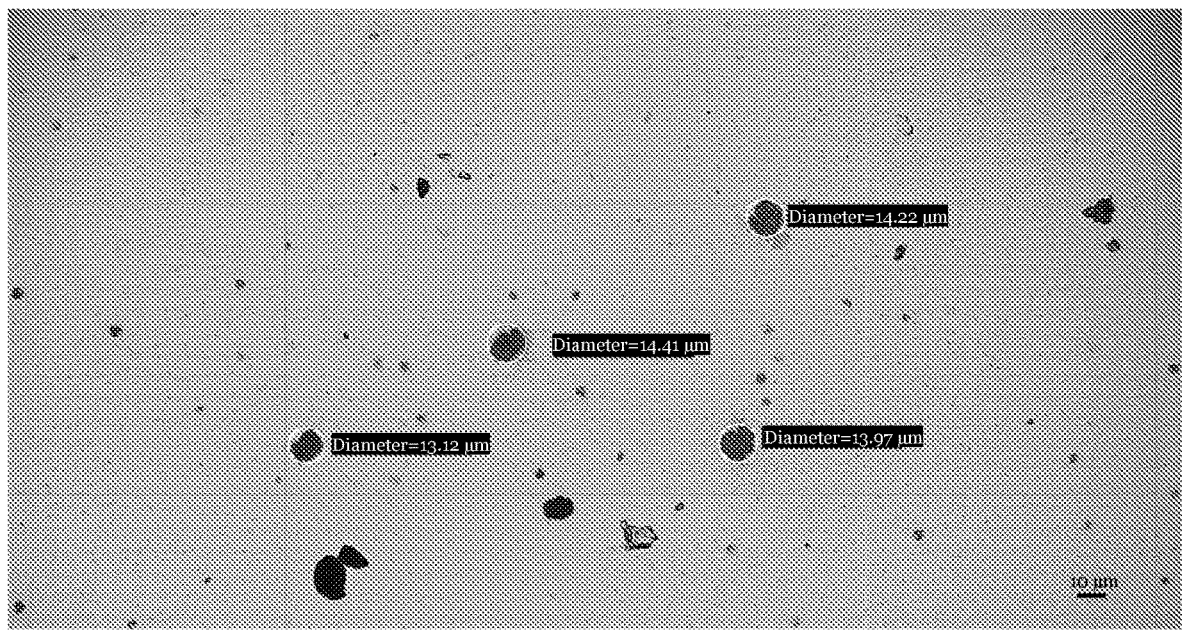

| | Composition of buffy coat | | | | | Composition of second portion of particles | | | | Composition of first portion of particles | | | |
|---|---|---|---|---|---|---|---|---|---|---|---|---|---|
| | NEUT $10^9$/L | LYMPH $10^9$/L | MONO $10^9$/L | BASO $10^9$/L | Column ID | NEUT $10^9$/L | LYMPH $10^9$/L | MONO $10^9$/L | BASO $10^9$/L | NEUT $10^9$/L | LYMPH $10^9$/L | MONO $10^9$/L | BASO $10^9$/L |
| Average diameter (µm) | 10-12 | 6-18 | 12-20 | 12-15 | | 10-12 | 6-18 | 12-20 | 12-15 | 10-12 | 6-18 | 12-20 | 12-15 |
| Cell concentration | 0.6 | 11.74 | 2.86 | 0.21 | W1031-20 | 0.61 | 10.95 | 2.25 | 0.16 | 0 | 0 | 0 | 0 |
| | | | | | W1031-30 | 0.39 | 6.35 | 1.87 | 0.13 | 0.08 | 3.34 | 0.07 | 0.1 |
| | | | | | W1031-40 | 0.3 | 3.45 | 1.4 | 0.16 | 0.38 | 8.86 | 1.63 | 0.1 |
| | | | | | W1031-50 | 0.08 | 0.61 | 0.17 | 0.01 | 0.56 | 11.17 | 2.4 | 0.22 | flow-through after application of the buffy coat sample onto column W1031-50 and centrifugation. FIG. 9e shows a microscope image of a sample, as obtained after suspension of the trapped cells and the microbeads matrix of column W1031-50 and centrifugation. Comparing FIG. 9d and FIG. 9e, it is evident that the column with 50 μm sized microbeads did only retain a small fraction of cells, while the majority of cells was found in the flow-through. Cells that were retained by the matrix comprising 50 μm sized microbeads were further analyzed with respect to their sizes. FIGS. 9f and 9g show microscope images in accordance with FIG. 9d and FIG. 9e, respectively, except that the magnification was increased. The diameter of the encircled cells was analyzed (assuming perfectly circular cells) and the results are summarized in the following Table 5.

TABLE 5

Image analysis of cells, as obtained in the flow-through (first portion of particles) and retained in the microbeads matrix (second portion of particles)

| | Diameter [μm] | |
| --- | --- | --- |
| | First portion of particles (FIG. 9f) | Second portion of particles (FIG. 9g) |
| Min | 9.35 | 13.12 |
| Max | 11.03 | 14.41 |
| Average | 10.53 | 13.93 |
| Count | 6 | 4 |

Based on these data, at least a trend towards larger cells in the retained portion can be derived.

Filter Performance on a Red Blood Cell Suspension

A column with a microbead matrix with three layers was prepared. The top layer consisted of microbeads of 30 μm diameter, the middle layer consisted of microbeads of 220 μm diameter, and the bottom layer was formed from 50 μm sized microbeads. The effective interstice diameter of the top layer was 4.6 μm.

Figure 10A:
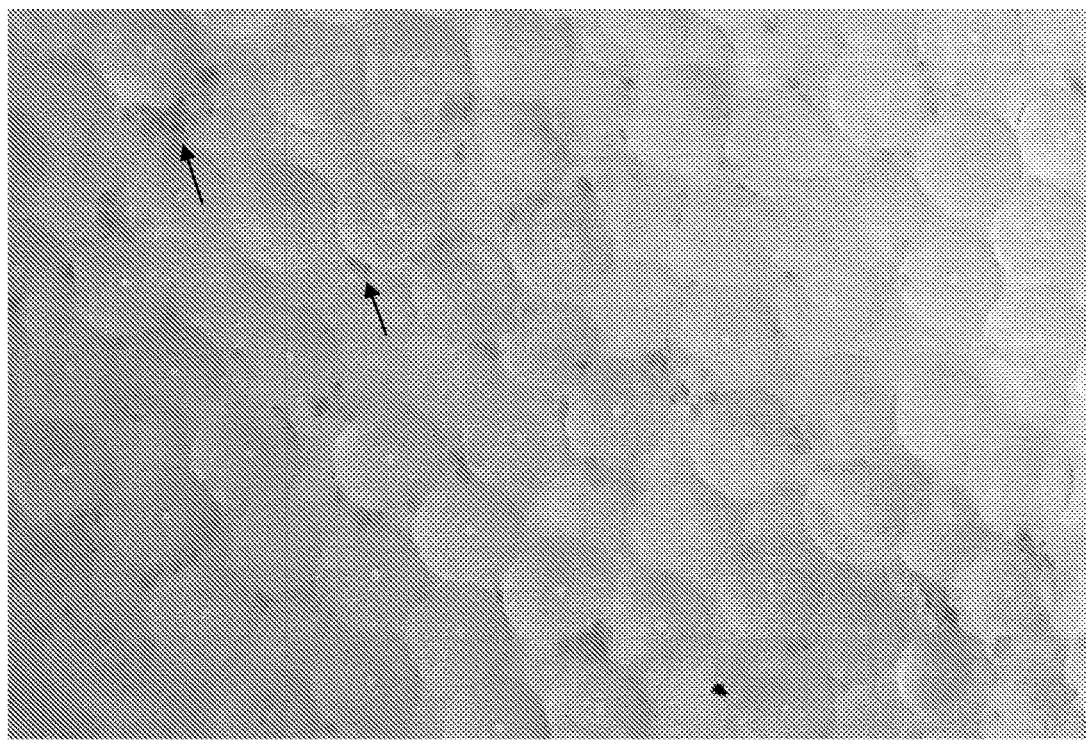
FIGS. 10a, b: show microscopic images (350× magnification) of agglutinated red blood cells trapped in the interstices of microbeads with an average size of 30 µm.
Figure 10B:
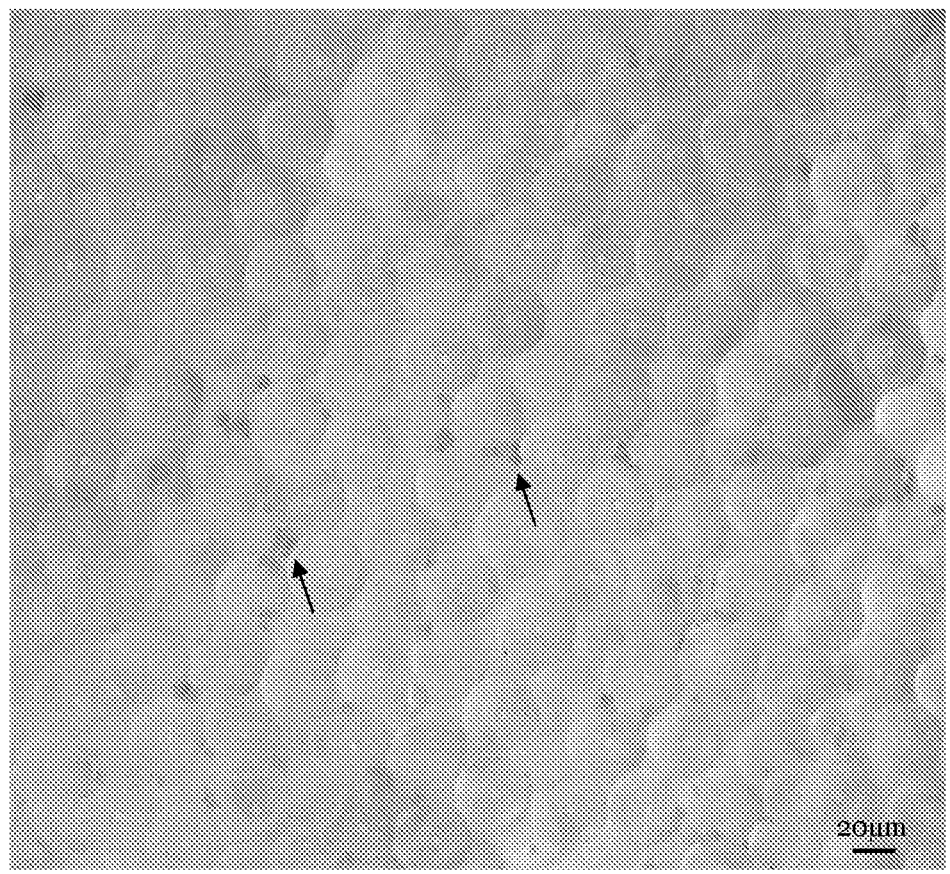

A 0.8% red blood cell (RBC) suspension was added onto the microbead matrix, and the column was centrifuged at less than 20 g for 2 minutes. After centrifugation, the column was placed under a light microscope to visualize the top layer (FIGS. 10a, 10b). Agglutinated RBCs (3 to 10 cells) could be observed to be trapped within the interstices of the top layer (exemplary spots labeled with arrows).

Importantly, RBCs and agglutinated RBCs, which are relatively constant in size, can be used as a reference ladder for optimizing the microbeads matrix to other target cells, such as circulating tumor cells.

The invention claimed is:

1. A method for the isolation of particles from a biological sample, the method comprising:
providing a column with an upper opening and an elongated channel with a lower opening, the elongated channel comprising at least a first section comprising a first plurality of substantially non-porous microbeads of a first diameter, wherein the first diameter is in a range of 1 μm to 700 μm;
providing a container that is positioned below the column that comprises a removable plug, the removable plug being positioned at the lower opening to prevent the first plurality of substantially non-porous microbeads from passing through the lower opening, wherein the removable plug comprises a centered protrusion of the container, and wherein at least a portion of the centered protrusion fits into the elongated channel, wherein a passage is formed between lateral walls of the elongated channel and lateral walls of the centered protrusion of the container, wherein the passage has a width allowing a liquid, or a first portion of particles of the biological sample to flow through the passage and into a chamber of the container, and wherein the first section providing interstices between neighboring substantially non-porous microbeads which act as a filter for the biological sample;
applying the biological sample onto the first section through the upper opening of the column;
separating the first portion of particles of the biological sample from a second portion of particles of the biological sample, the first portion of particles of the biological sample passing through the first section, the first section retaining the second portion of particles of the biological sample, and the retained second portion of particles being trapped within the interstices;
suspending the retained second portion of particles of the biological sample and the first section in a buffer solution to form a suspension; and
separating the suspended second portion of particles of the biological sample from the suspended first section.

2. The method of claim 1, wherein the first portion of particles of the biological sample is separated from the second portion of particles of the biological sample by means of gravity or by application of a centrifugal force,
wherein the separated first portion of particles of the biological sample is collected in a first container.

3. The method of claim 1, wherein the suspended second portion of particles is separated from the suspended first section by means of gravity or application of a centrifugal force.

4. The method of claim 1, wherein the method further comprising:
concentrating the separated first or second portion of particles of the biological sample, wherein a centrifugal force is applied for concentrating the separated first or second portion of particles of the biological sample.

5. The method of claim 1, wherein the substantially non-porous microbeads are substantially non-compressible.

6. The method of claim 1, wherein the centered protrusion comprises at least an upper portion and a lower portion wherein the upper portion fits into the column, and wherein the lower portion supports the lateral walls of the lower opening of the column; and/or
wherein the width of the passage formed between the lateral walls of the elongated channel and the lateral walls of the centered protrusion of the container is between 10 and 40 μm.

7. The method of claim 1, further comprising:
collecting the suspension in a second container by means of aspirating the suspension and transferring the suspension to the second container.

8. The method of claim 1, wherein the first section and the second section are provided as stacked layers with the first section being the top layer,
wherein the column comprises a plurality of sections, two of the sections being the first section and the second section, wherein each section comprises a plurality of substantially non-porous microbeads of a specific diameter, the plurality of sections differs at least by the specific diameter of the substantially non-porous microbeads, wherein the first diameter of the first section comprises the smallest diameter.

9. The method of claim 8, wherein the plurality of sections comprises three to seven sections.

10. The method of claim 1, wherein the method is used for the isolation of circulating tumor cells, wherein the first diameter is in a range of 80 to 200 µm; or wherein the method is used for the isolation of circulating microemboli, and
wherein the first diameter is in a range of 200 to 600.

11. An automated liquid handling system for the isolation of particles from a biological sample, comprising:
a column with an upper opening and an elongated channel having a lower opening, the elongated channel comprising at least a first section comprising a first plurality of substantially non-porous microbeads of a first diameter, wherein the first diameter is in a range of 1 µm to 700 µm, the first plurality of substantially non-porous microbeads being retained in the column by a constricting means that is positioned at the lower opening to prevent the first plurality of substantially non-porous microbeads from passing through the lower opening and
a container,
wherein the constricting means comprises a removable plug, wherein the removable plug is a centered protrusion of the container and is positioned at the lower opening of the elongated channel, and wherein at least a portion of the protrusion fits into the elongated channel, wherein a passage is formed between lateral walls of the elongated channel and lateral walls of the centered protrusion of the container, wherein the passage has a width allowing a liquid, or a first portion of particles of the biological sample to flow through the passage and into a container chamber,
and wherein the first section providing interstices between neighboring substantially non-porous microbeads which act as a filter for the biological sample;
means for separating the first portion of particles of the biological sample from a second portion of particles of the biological sample, the first portion of particles of the biological sample passing through the first section, and the first section retaining the second portion of particles of the biological sample, and the retained second portion of particles being trapped within the interstices;
means for suspending the retained second portion of particles of the biological sample and the first section in a buffer solution to form a suspension; and
means for separating the suspended second portion of particles of the biological sample from the suspended first section.

12. The method of claim 6, wherein the width of the passage formed between the lateral walls of the elongated channel and the lateral walls of the centered protrusion of the container is about 20 µm.

13. The method of claim 1, further comprising:
collecting the suspension in a second container by means of gravity or by application of a centrifugal force.

14. The method of claim 8, wherein the plurality of sections is provided as stacked layers, the first being the top layer, and wherein the specific diameter of the substantially non-porous microbeads of the plurality of sections increases gradually from the top layer to the bottom layer.

* * * * *